United States Patent
Ochi

(10) Patent No.: US 7,796,332 B2
(45) Date of Patent: Sep. 14, 2010

(54) 3D DISPLAY DEVICE

(75) Inventor: Hideo Ochi, Saitama (JP)

(73) Assignee: Pioneer Corporation, Tokyo (JP)

( * ) Notice: Subject to any disclaimer, the term of this patent is extended or adjusted under 35 U.S.C. 154(b) by 236 days.

(21) Appl. No.: 11/719,698

(22) PCT Filed: Nov. 14, 2005

(86) PCT No.: PCT/JP2005/020842

§ 371 (c)(1),
(2), (4) Date: Jun. 14, 2007

(87) PCT Pub. No.: WO2006/054518

PCT Pub. Date: May 26, 2006

(65) Prior Publication Data

US 2008/0285127 A1    Nov. 20, 2008

(30) Foreign Application Priority Data

Nov. 18, 2004  (JP) .............................. 2004-335183

(51) Int. Cl.
G02B 27/22  (2006.01)
(52) U.S. Cl. ........................................ 359/462; 348/55

(58) Field of Classification Search .................... None
See application file for complete search history.

(56) References Cited

U.S. PATENT DOCUMENTS

| 5,945,965 A | 8/1999 | Inoguchi et al. |
| 7,221,332 B2 * | 5/2007 | Miller et al. ................... 345/32 |
| 2006/0170833 A1 * | 8/2006 | Lin et al. ....................... 349/15 |

FOREIGN PATENT DOCUMENTS

| JP | 6-160770 A | 6/1994 |
| JP | 9-73049 A | 3/1997 |

* cited by examiner

*Primary Examiner*—Lee Fineman
(74) *Attorney, Agent, or Firm*—Foley & Lardner LLP

(57) ABSTRACT

Upon displaying a targeted stereoscopic image formed by a background image planar component and a spring-out image stereoscopic component, a stereoscopic display device controls and stereoscopically displays the spring-out image having a large parallax so that the amount of transmitted light of a light transmitting portion of a light control panel is T1. Thereafter, the amount of transmitted light of the light transmitting portion of the light control panel is switched from T1 to T2, where T2 is larger than T1. The background image having a small parallax is displayed.

7 Claims, 15 Drawing Sheets

3D DISPLAY DEVICE

TECHNICAL FIELD

The present invention relates to a stereoscopic display device. However, utilization of the present invention is not limited to the stereoscopic display device.

BACKGROUND ART

In general, a stereoscopic display device is of a binocular type in which the respective images from the left and right visual points (hereinafter, binocular-parallax images) are presented to the left and right eyes of an observer. A stereoscopic display device of such a type makes it possible to obtain a stereoscopic image by displaying a plurality of binocular-parallax images and recomposing them. As a method of presenting the respective binocular-parallax images to the left and right eyes of an observer in a stereoscopic display device of a binocular type, for example a method of using a pair of eyeglasses such as special polarizing glasses or shutter glasses is mentioned. Lenticular type, parallax stereogram type and similar methods are examples of methods that do not employ the use of glasses.

And there is a stereoscopic display device using an integral photography method (hereinafter, an IP method for short) that is proposed up to now in a field of photography. For example, an IP method stereoscopic display device has a display panel for displaying multiple planar images obtained by viewing a target stereoscopic image from different directions and a light control panel of non-transmissibility that is located on the front face (viewing side) of the display panel and formed so as to enable viewing of the images on the display panel through a light transmitting portion.

As an example of an IP method stereoscopic display device, there is a method that synchronously performs updating of the planar images on the display panel and control of the transmissibility of a light transmitting portion of the light control panel (see Patent Document 1 for example). In such a method, light transmitting portions that are usually non-transmissible are made selectively transmissible sequentially and planar images corresponding to the light transmitting portions made transmissible are displayed properly on the display panel. In such a way, viewing all planar images updated and sequentially displayed within an afterimage retaining time of eye enables a desired stereoscopic image as a whole to be viewed.

Here, in particular such a method is called a multiplex pinhole scanning type integral photography method (hereinafter, an MPS-IP method for short). According to the MPS-IP method, since light transmitting portions are made transmissible sequentially and planar images are updated synchronously, planar images observable from one light transmitting portion increase. Therefore, the resolution is improved compared with a conventional IP method in which a light transmitting portion does not change usually in transmittance.

Patent Document 1: Japanese Patent Laid-Open Publication No. H6-160770

DISCLOSURE OF INVENTION

Problem to be Solved by the Invention

In case of performing a stereoscopic display using a stereoscopic display device of an IP method, an MPS-IP method, or the like, since an image on a display panel is observed through a light transmitting portion of a light control panel as described above, a light output from the display panel is blocked by a light control panel of non-transmissibility. Therefore, the amount of transmitted light to reach the observing side is reduced and as a result, the external observation brightness of the stereoscopic display device is reduced. Here, the external observation brightness is the brightness perceived when the stereoscopic display device is observed, and is distinguished from the emission brightness of the display panel.

In a stereoscopic display device being low in external observation brightness in such a way, it is necessary to make a display panel high in brightness to obtain a good visual recognition. However, improvement in emission brightness of a display panel is limited from the viewpoint of the life of a light emitting element forming a display panel, power consumption and the like, and therefore it is difficult to realize a sufficient external observation brightness in a stereoscopic display device.

Means for Solving Problem

A stereoscopic display device related to the invention according to claim 1 that displays planar images providing binocular parallaxes and thereby performs a stereoscopic display includes a displaying unit that displays a plurality of planar images being components of a targeted stereoscopic image based on input image data; and a light control unit that is disposed between the displaying unit and an observer and adjusts the amount of transmitted light from the displaying unit, where the light control unit has a base body of optical non-transmissibility, a plurality of light transmitting portions that are formed on the base body and are visible domains of the planar images, and a light transmitting portion adjusting unit that adjusts the amount of transmitted light by adjusting the area of the light transmitting portions, and where the stereoscopic display device displays a targeted stereoscopic image by making a stereoscopic display having the amount of transmitted light of the light transmitting portions adjusted to a first amount and a planar display having the amount of transmitted light of the light transmitting portions adjusted to a second amount larger than the first amount switch at a frequency of at least 15 Hz.

EXPLANATIONS OF LETTERS OR NUMERALS

Figure 1:
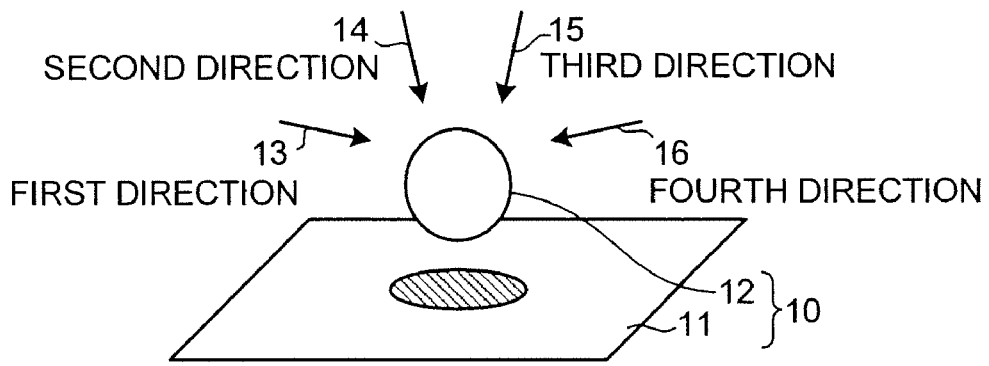
FIG. 1 is a schematic diagram showing the composition of a stereoscopic image to be displayed by a stereoscopic display device according to an embodiment of the present invention.

10 Stereoscopic image
11 Background
12 Spherical body
20a to 20d Component planar image
60a to 60d Image data
100 Stereoscopic display device
101 Display panel
102 Light control panel
103 Signal generator
200 User
210, 211 Domain
400 Shutter plate
401 Supporting shaft
402 Frame member
500 Panel base member
501 Pinhole
600 Pinhole shutter
700 Liquid crystal panel
701 Unit cell
1021 Optical slit
1022 Optical slit member
1023 Optical slit driver

BEST MODE(S) FOR CARRYING OUT THE INVENTION

Exemplary embodiments of a stereoscopic display device according to the present invention are described in detail in the following. These embodiments can display a stereoscopic image with a good display characteristic and aim at providing a stereoscopic display device making it possible to improve the external observation brightness and realize a good visual recognition as one of their objects.

First, FIG. 1 is a schematic diagram showing the composition of a three-dimensional stereoscopic image (hereinafter, simply a stereoscopic image) to be displayed by a stereoscopic display device according to an embodiment of the present invention. That is, here a stereoscopic image 10 shown in FIG. 1 corresponds to an object to be displayed of the stereoscopic display device, in other words, a targeted image. As shown in FIG. 1, the stereoscopic image 10 shows a state where a spherical body 12 having a three-dimensional stereoscopic shape is floating from a background 11 formed of a two-dimensional plane, namely, a state where a spherical body 12 is springing out from a background. In such a way the stereoscopic image 10 is composed to include the background 11 being a planar component (concretely a background portion) and the spherical body 12 being a stereoscopic component (concretely a springing-out portion).

FIGS. 2 to 5 schematic diagrams each show a component planar image to be used for displaying the stereoscopic image 10 of FIG. 1. Here a component planar image means a binocular-parallax image to be used for displaying the stereoscopic image 10 of FIG. 1, and the targeted stereoscopic image 10 of FIG. 1 is obtained by displaying these component planar images sequentially. Here, as shown in FIGS. 2 to 5, a display of the stereoscopic image 10 of FIG. 1 is realized by component planar images 20a to 20d respectively obtained by observing the stereoscopic image 10 of FIG. 1 from each of first to the fourth directions indicated by arrows 13 to 16 in FIG. 1.

Figure 2:
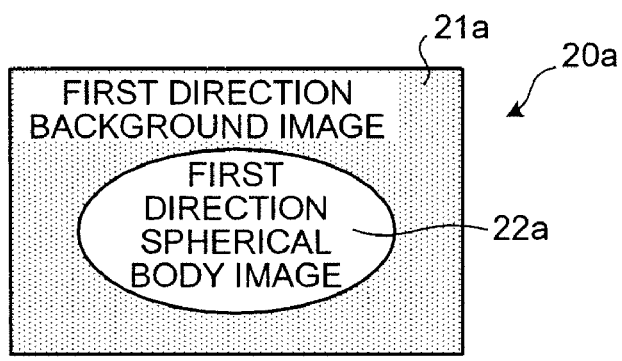
FIG. 2 is a schematic diagram showing a component planar image to be used in displaying the stereoscopic image of FIG. 1.

A component planar image 20a shown in FIG. 2 is a planar image obtained by representing two-dimensionally the stereoscopic image 10 of FIG. 1 observed from the first direction (direction of arrow 13 in FIG. 1). In the following, similarly, a component planar image 20b shown in FIG. 3 is a planar image obtained by representing two-dimensionally the stereoscopic image 10 of FIG. 1 observed from the second direction (direction of arrow 14 in FIG. 1), a component planar image 20c shown in FIG. 4 is a planar image obtained by representing two-dimensionally the stereoscopic image 10 of FIG. 1 observed from the third direction (direction of arrow 15 in FIG. 1), and a component planar image 20d shown in FIG. 5 is a planar image obtained by representing two-dimensionally the stereoscopic image 10 of FIG. 1 observed from the fourth direction (direction of arrow 16 in FIG. 1).

As shown in FIG. 2, the component planar image 20a is composed of a first direction background image 21a obtained by representing two-dimensionally the background 11 of the stereoscopic image 10 of FIG. 1 observed from the first direction (direction of arrow 13 in FIG. 1) and a first direction spherical body image 22a obtained by representing two-dimensionally the spherical body 12 (see FIG. 1) of the stereoscopic image 10 of FIG. 1 observed from the first direction (direction of arrow 13 in FIG. 1).

Figure 3:
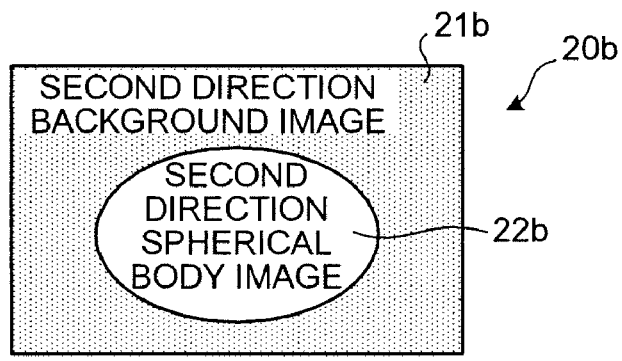
FIG. 3 is a schematic diagram showing a component planar image to be used in displaying the stereoscopic image of FIG. 1.
Figure 4:
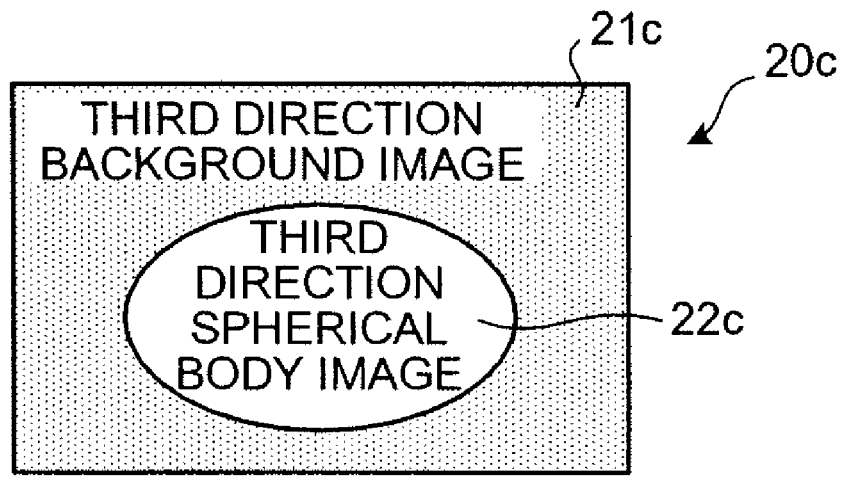
FIG. 4 is a schematic diagram showing a component planar image to be used in displaying the stereoscopic image of FIG. 1.
Figure 5:
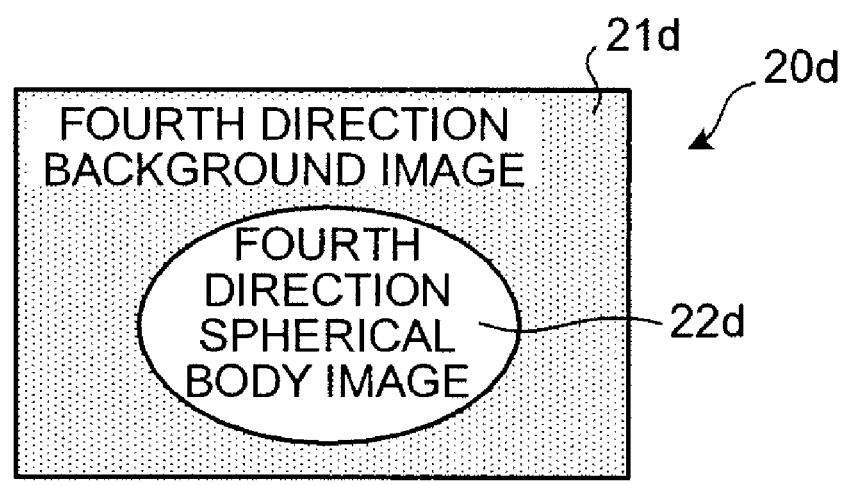
FIG. 5 is a schematic diagram showing a component planar image to be used in displaying the stereoscopic image of FIG. 1.

In the following, similarly, as shown in FIG. 3 the component planar image 20b is composed of a second direction background image 21b obtained by representing two-dimensionally the stereoscopic image 10 of FIG. 1 observed from the second direction (direction of arrow 14 in FIG. 1) and a second direction spherical body image 22b; as shown in FIG. 4 the component planar image 20c is composed of a third direction background image 21c obtained by representing two-dimensionally the stereoscopic image 10 of FIG. 1 observed from the third direction (direction of arrow 15 in FIG. 1) and a third direction spherical body image 22c; and as shown in FIG. 5 the component planar image 20d is composed of a fourth direction background image 21d obtained by representing two-dimensionally the stereoscopic image 10 of FIG. 1 observed from the fourth direction (direction of arrow 16 in FIG. 1) and a fourth direction spherical body image 22d.

For convenience, in FIGS. 2 to 5, each of the first direction spherical body image 22a to the fourth direction spherical body image 22d of the component planar images 20a to 20d is shown as an image being in the same shape, but actually each of the first direction spherical body image 22a to the fourth direction spherical body image 22d of the component planar images 20a to 20d is an image being different in shape from one another. The reason why each of the first direction spherical body image 22a to the fourth direction spherical body image 22d has a shape being different from one another is that when the spherical body 12 (see FIG. 1) being a stereoscopic component of the stereoscopic image 10 of FIG. 1 is observed from each of the first to the fourth directions (the directions of arrows 13 to 16 in FIG. 1) some parallax occurs according to the direction of observation, namely, the appearance varies according to the direction of observation.

On the other hand, the first direction background image 21a to the fourth direction background image 21d to be used in displaying the background 11 (see FIG. 1) being a planar component of the stereoscopic image 10 of FIG. 1 have nearly the same appearance when observed from any direction, since the parallax to occur according to the direction of observation is small or little when the first direction background image 21a to the fourth direction background image 21d are observed from the first to the fourth directions (directions of arrows 13 to 16 in FIG. 1). Therefore, in the first direction background image 21a to the fourth direction background image 21d of the component planar images 20a to 20d of FIGS. 2 to 5, there is nearly no difference between these images (namely, no point of difference between the images).

Figure 6:
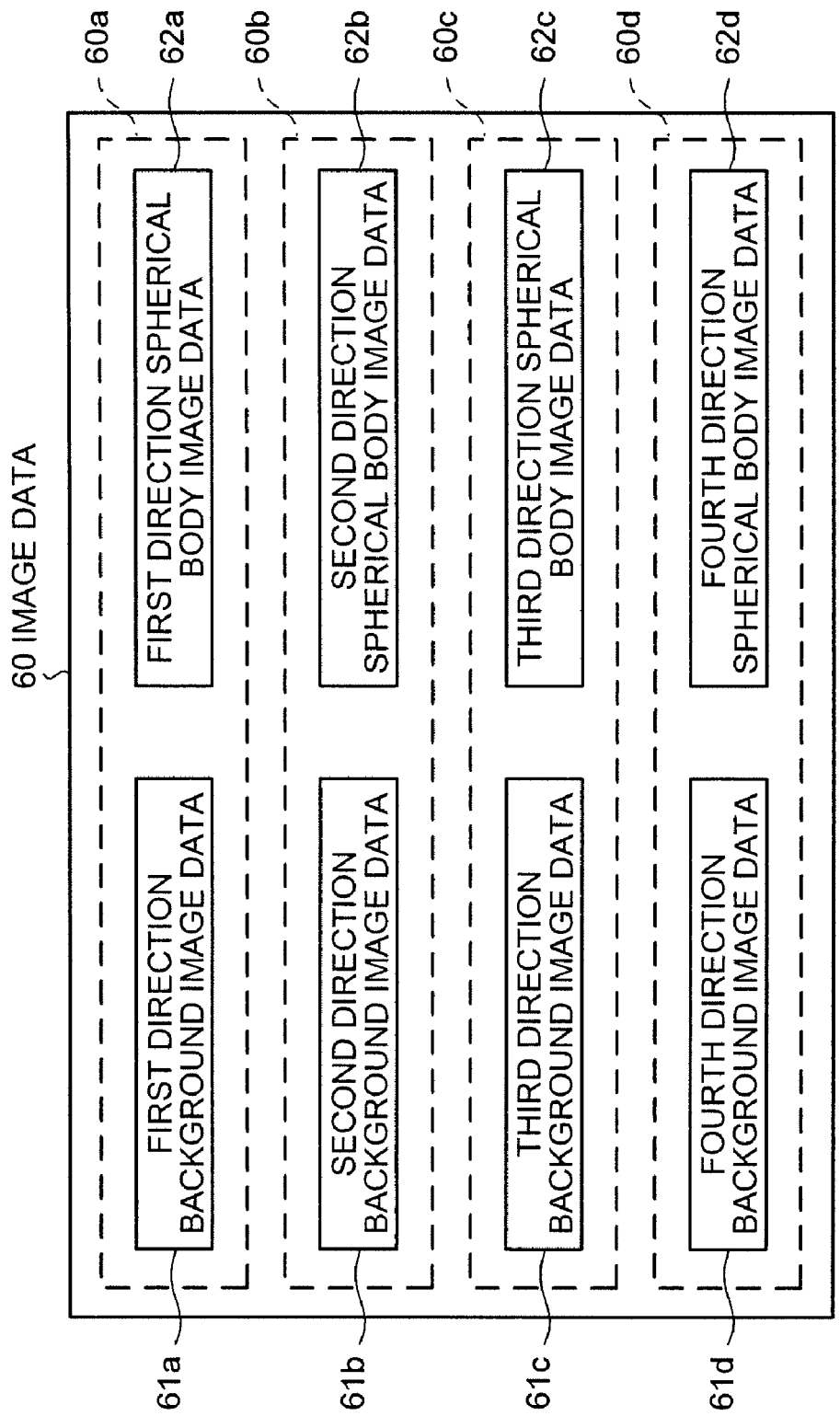
FIG. 6 is a schematic diagram showing a composition of image data to be used in displaying the stereoscopic image of FIG. 1.

FIG. 6 is a schematic diagram showing the composition of image data to be used in displaying the stereoscopic image 10 of FIG. 1. As shown in FIG. 6, image data 60 to be used in displaying the stereoscopic image 10 of FIG. 1 is composed to include image data 60a to 60d corresponding to the respective component planar images 20a to 20d shown in FIGS. 2 to 5. That is, the image data 60 includes image data 60a to be used in displaying the component planar image 20a of FIG. 2, image data 60b to be used in displaying the component planar image 20b of FIG. 3, image data 60c to be used in displaying the component planar image 20c of FIG. 4, and image data 60d to be used in displaying the component planar image 20d of FIG. 5.

And image data 60a includes data 61a of the first direction background image 21a (see FIG. 2) of the component planar image 20a of FIG. 2 and data 62a of the first direction spherical body image 22a (see FIG. 2) of the component planar image 20a. In the following, similarly, image data 60b includes data 61b of the second direction background image 21b (see FIG. 3) of the component planar image 20b of FIG. 3 and data 62b of the second direction spherical body image 22b (see FIG. 3), image data 60c includes data 61c of the third direction background image 21c (see FIG. 4) of the component planar image 20c of FIG. 4 and data 62c of the third direction spherical body image 22c (see FIG. 4), and image data 60d includes data 61d of the fourth direction background image 21d (see FIG. 5) of the component planar image 20d of FIG. 5 and data 62d of the fourth direction spherical body image 22d (see FIG. 5).

In FIG. 6, the case in which the image data 60 include the data 61a to 61d respectively corresponding to the first direction background image 21a to the fourth direction background image 21d (see FIGS. 2 to 5) of the component planar images 20a to 20d of FIGS. 2 to 5, but since there is nearly no difference between the first direction background image 21a to the fourth direction background image 21d (see FIGS. 2 to 5) of the component planar images 20a to 20d of FIGS. 2 to 5 as described above, only the data corresponding to a background image in a specified direction out of the first direction background image 21a to the fourth direction background image 21d (see FIGS. 2 to 5) may be used commonly in the component planar images 20a to 20d of FIGS. 2 to 5.

Figure 7:
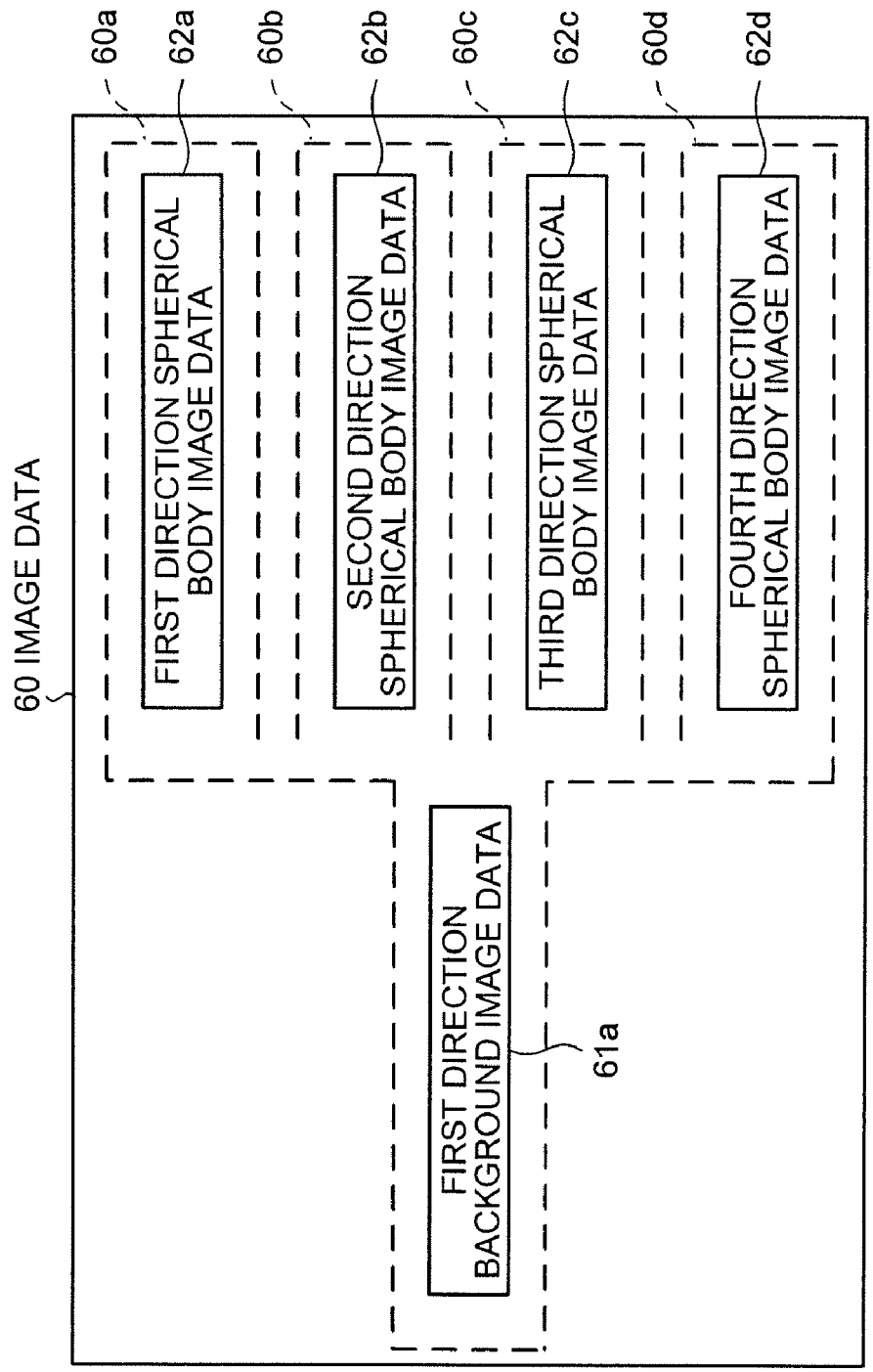
FIG. 7 is a schematic diagram showing another composition of image data used in displaying the stereoscopic image of FIG. 1.

For example, FIG. 7 is a schematic diagram showing another composition of image data to be used in displaying the stereoscopic image 10 of FIG. 1. As shown in FIG. 7, in this case, image data 60 includes a piece of data 61a of the first direction background image 21a of FIG. 2 as the data corresponding to a background image, and the first direction background image 21a of FIG. 2 to the fourth direction background image 21d of FIG. 5 are displayed using commonly this piece of data 61a. In such a way the capacity of image data 60 can be reduced by using commonly the image data 61a.

A stereoscopic display device according to an embodiment of the present invention displays the component planar images 20a to 20d of FIGS. 2 to 5 using the image data 60 of FIG. 6 or 7, and thereby displays the stereoscopic image 10 of FIG. 1. A displaying operation of the stereoscopic display device is described in the following.

First Embodiment

Figure 8:
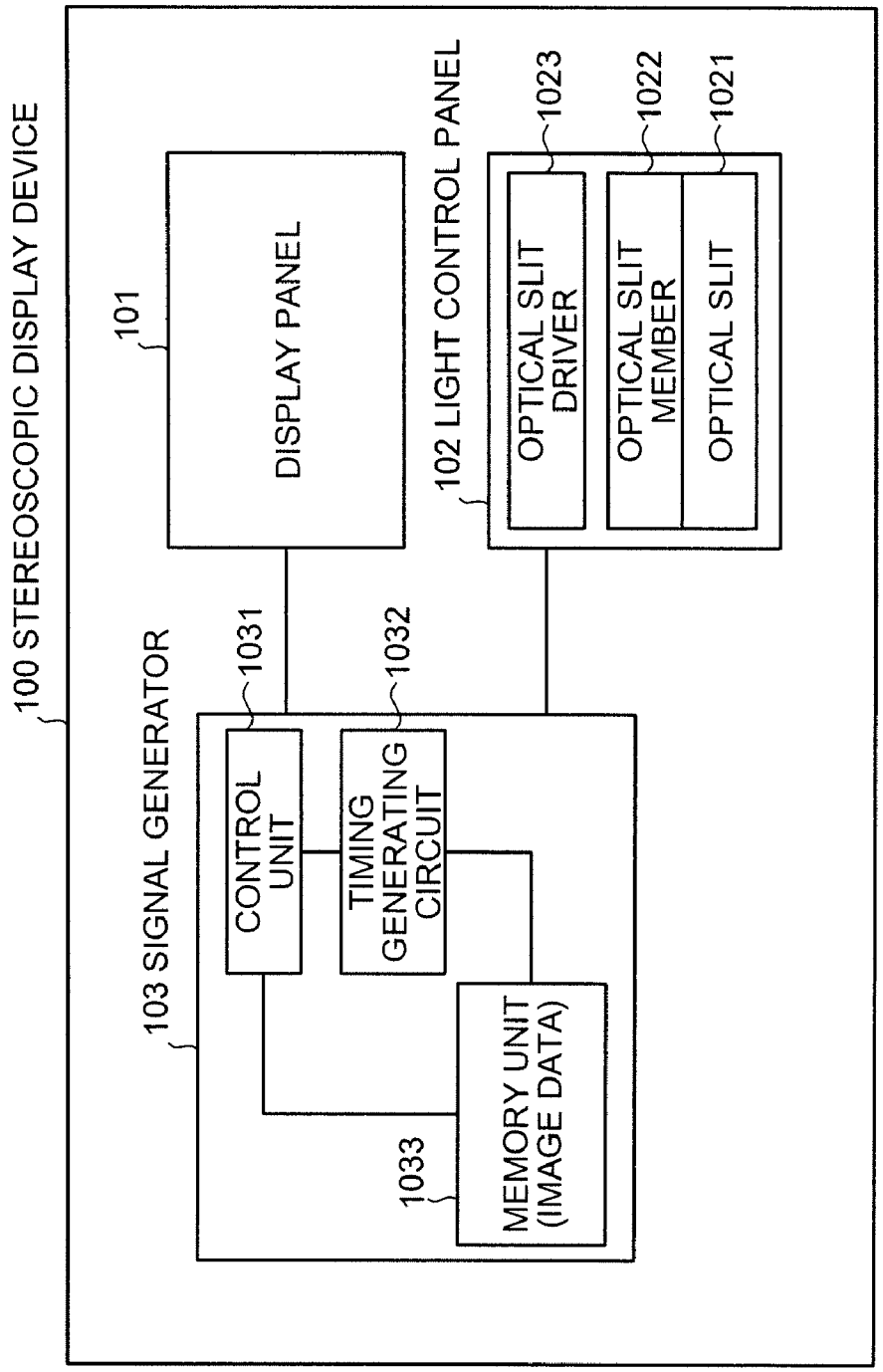
FIG. 8 is a schematic block diagram showing the composition of a stereoscopic display device according to a first embodiment of the present invention.
Figure 9:
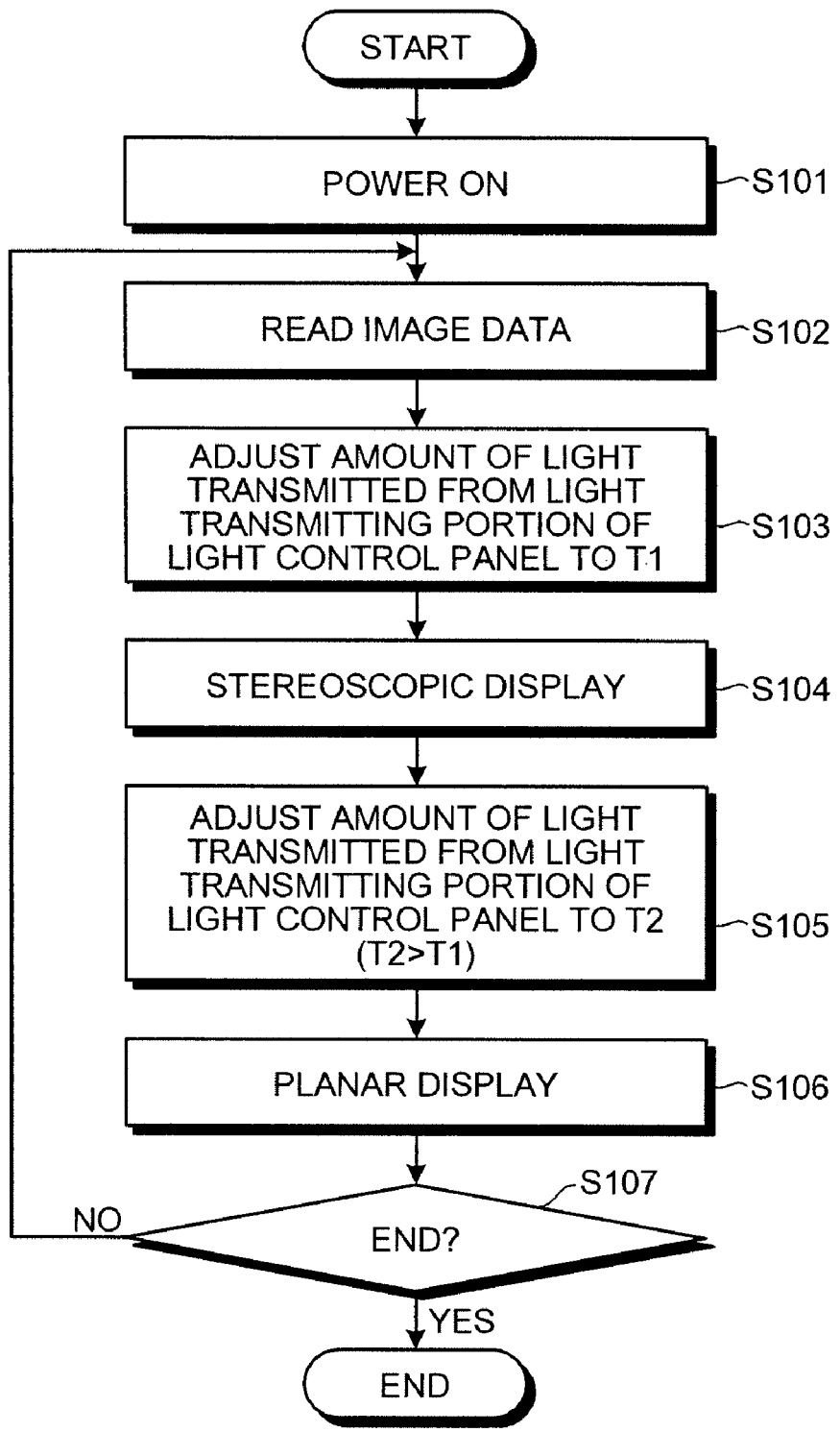
FIG. 9 is a flow chart showing an outline of a displaying operation of the stereoscopic display device according to the first embodiment of the present invention.

FIG. 8 is a schematic block diagram showing a composition of a stereoscopic display device according to a first embodiment of the present invention. And FIG. 9 is a flowchart showing an outline of a displaying operation of the stereoscopic display device of FIG. 8.

First, referring to FIG. 8, a stereoscopic display device 100 according to this embodiment is described. The stereoscopic display device 100 includes a display panel 101 having a plurality of pixels (not illustrated) arranged in the shape of a matrix and a light control panel 102 the panel body of which is formed of an optical slit member 1022 in which an optical slit 1021 is formed. The light control panel 102 is disposed between the display panel 101 and a user (observer), concretely, in the front (at the side near the observer) of the display panel. The stereoscopic display device 100 includes also a signal generator 103 for drive-controlling the display panel 101 and the light control panel 102 by sending control signals to them.

In the stereoscopic display device 100 of this embodiment, the display panel 101 corresponds to a display unit, the light control panel 102 corresponds to a light control unit, the optical slit 1021 of the light control panel 102 corresponds to a light transmitting portion, and the optical slit member 1022 and an optical slit driver 1023 described later correspond to a light transmitting portion adjusting unit.

The signal generator 103 includes a control unit 1031 formed of a CPU, a timing generating circuit 1032, and a memory unit 1033 formed of semiconductor memories. Although not illustrated here, the signal generator 103 includes properly components other than these components. The image data 60 shown in FIG. 6 or 7 are stored in the memory unit 1033. Here, the image data 60 of FIG. 7 are stored in the memory unit 1033, and these image data 60 (see FIG. 7) are read through the timing generating circuit 1032 and are output to the display panel 101.

In addition to reading and outputting of the image data 60 of FIG. 7, the timing generating circuit 1032 of the signal generator 103 generates various control signals for controlling the display panel 101 and the light control panel 102 and outputs these signals to the display panel 101 and the light control panel 102, respectively. For example, the timing generating circuit 1032 can perform division of a system clock, update of an image, and adjustment of phase synchronization, and the like.

As control signals that are generated by the signal generator 103 and output to the display panel 101, there are mentioned, for example, a control signal for controlling a scanning frequency of the display panel 101 or an image update rate (concretely a clock signal), a control signal for controlling the emission brightness of the display panel 101, a control signal for controlling a lighting time of the display panel 101, a control signal for controlling a power source voltage of the display panel 101, and the like.

As control signals that are generated by the signal generator 103 and output to the light control panel 102, there are mentioned, for example, a control signal for controlling the timing of formation of an optical slit 1021 by being output to an optical slit driver 1023 (concretely a clock signal), a control signal for controlling a position where the optical slit 1021 is formed, and the like.

The light control panel 102 includes an optical slit driver 1023 for controlling formation of an optical slit 1021 in the optical slit member 1022. The optical slit driver 1023 forms an optical slit 1021 having a specified opening area at a specified position in the optical slit member 1022 based on a control signal output from the signal generator 103.

In the stereoscopic display device 100 having such a composition, a series of operations shown in FIG. 9 are performed at the time of displaying the stereoscopic image 10 of FIG. 1. Concretely, as shown in FIG. 9, first, a power source is turned on and thereby the stereoscopic display device 100 (see FIG. 8) is started (step S101), and in the signal generator 103 of FIG. 8 the image data 60 of FIG. 7 is read through the timing generating circuit 1032 from the memory unit 1033 (see FIG. 8) (step S102).

The image data 60 of FIG. 7 read from the memory unit 1033 of FIG. 8 in this way are output from the signal generator 103 of FIG. 8 to the display panel 101 (see FIG. 8). Information of the image data 60 of FIG. 7 is read by the signal generator 103, and according to the read information the signal generator 103 properly generates various signals for controlling the operations of the display panel 101 and the light control panel 102 (for both, see FIG. 8). Various control signals generated in such a way are output respectively to the display panel 101 and the light control panel 102 (for both, see FIG. 8). And based on these control signals, the display panel 101 and the light control panel 102 (for both, see FIG. 8) are driven.

Here, the display panel 101 of FIG. 8 displays successively the component planar images 20a to 20d shown in FIGS. 2 to 5, based on the image data 60a to 60d of FIG. 7 output from the signal generator 103 of FIG. 8 and control signals generated and output correspondingly to the image data 60a to 60d of FIG. 7 output from the signal generator 103 of FIG. 8. In the light control panel 102 of FIG. 8, the optical slit driver 1023 (see FIG. 8) drives the optical slit member 1022 (see FIG. 8) based on the control signals generated and output by the signal generator 103 of FIG. 8 correspondingly to the image data 60a to 60d of FIG. 7, and thereby forms a light transmitting portion in the light control panel 102 (see FIG. 8) by properly forming an optical slit 1021 (see FIG. 8) in the optical slit member 1022 (see FIG. 8).

As shown in FIG. 9, in this case, the formation of an optical slit 1021 (see FIG. 8) in the optical slit member 1022 (see FIG. 8) is controlled so that the amount of transmitted light in a light transmitting portion of the light control panel 102 of FIG. 8 is adjusted to T1 (namely, corresponding to a first amount) (step S103). Here, the amount of transmitted light in one optical slit 1021 (see FIG. 8) is defined as the product of the opening area of the optical slit 1021 (see FIG. 8) and the time for which a light-transmissible state is retained in the optical slit 1021 (see FIG. 8) (concretely, the time for which the optical slit 1021 of FIG. 8 is formed and retained). Further, here the sum of the amounts of transmitted light of a plurality of optical slits 1021 (see FIG. 8) formed in the light control panel 102 (see FIG. 8) is defined as the amount of transmitted light in the light transmitting portions of the light control panel 102.

The component planar images 20a to 20d of FIGS. 2 to 5 successively displayed on the display panel 101 (see FIG. 8) are observed through an optical slit 1021 see FIG. 8) of the light control panel 102 (see FIG. 8) formed in such a way. As a result, a stereoscopic image 10 composed of a spherical body 12 and a background 11 is stereoscopically displayed as shown in FIG. 1 (step S104).

After the stereoscopic display is performed, subsequently the display panel 101 (see FIG. 8) displays only the first direction background image 21a shown in FIG. 2, based on the first direction background image data 61a of FIG. 7 output from the signal generator 103 of FIG. 8 and control signals generated and output by the signal generator 103 of FIG. 8 correspondingly to the data 61a. On the other hand, in the light control panel 102 (see FIG. 8), the optical slit driver 1023 (see FIG. 8) drives the optical slit member 1022 (see FIG. 8) based on control signals generated and output by the signal generator 103 of FIG. 8 correspondingly to the first direction background image data 61a of FIG. 7 and thereby, properly forms an optical slit 1021 (see FIG. 8) in the optical slit member 1022 (see FIG. 8).

In this case, the formation of an optical slit 1021 (see FIG. 8) in the optical slit member 1022 (see FIG. 8) is controlled so that the amount of transmitted light in a light transmitting portion of the light control panel 102 of FIG. 8 is adjusted to T2 (namely, corresponding to a second amount) being larger than the amount of transmitted light T1 at the time of the stereoscopic display described above (step S105). And only the background 11 of the stereoscopic image 10 of FIG. 1 is plane-displayed by observing the first direction background image 21a of FIG. 2 displayed on the display panel 101 (see FIG. 8) through an optical slit 1021 (see FIG. 8) of the light control panel 102 (see FIG. 8) formed in this way (step S106).

Here, as described above, since in planar display of the background 11 (see FIG. 1) in step S106, the amount of transmitted light T2 of a light transmitting portion (concretely an optical slit 1021 of FIG. 8) of the light control panel 102 (see FIG. 8) is larger than the amount of transmitted light T1 in case of stereoscopically displaying the stereoscopic image 10 (see FIG. 1) in step S104, the external observation brightness in the planar display of step S106 is higher than the external observation brightness of the stereoscopic display in step S104.

In such a way, the stereoscopic display device 100 (see FIG. 8) makes a stereoscopic display in step S104 being lower in external observation brightness and a planar display in step S106 being higher in external observation brightness coexist by changing over them from each other with the lapse of time. By doing so, the stereoscopic display of the background 11 and the spherical body 12 of FIG. 1 and the planar display of the background 11 of FIG. 1 are combined with each other with the lapse of time, and as a result the stereoscopic image 10 of FIG. 1 can be obtained. A stereoscopic display device 100 performing such a displaying operation can improve the external brightness as a whole by making a planar display of higher brightness coexist in a stereoscopic display of lower brightness.

After a planar display is performed as described above, whether an instruction for end of the displaying operation is input is determined (step S107). When the instruction of end is input (step S107: Yes), the displaying operation ends. On the other hand, when no instruction of end is input (step S107: No), the procedure returns to step S102 again and the displaying operation is continued.

As described above, in the stereoscopic display device 100 (see FIG. 8) of this embodiment, by making step S104 of a stereoscopic display being lower in external observation brightness and step S106 of a planar display being higher in external observation brightness coexist through changing over them with the lapse of time, it is possible to improve the whole external observation brightness without making higher the emission brightness of the display panel 101 (see FIG. 8). Therefore, in the stereoscopic display device 100 (see FIG. 8), it is possible to display the stereoscopic image 10 of FIG. 1 with a good visual recognition and improve the external observation brightness and the resolution while realizing a good stereoscopic effect and without increasing the power consumption.

In this case, in the stereoscopic display in step S104, since the amount of transmitted light of a light transmitting portion of the light control panel 102 (see FIG. 8) is made small as T1, a good stereoscopic display similar to a conventional stereoscopic display device can be realized. On the other hand, in the planar display of step S106 in which the amount of transmitted light of a light transmitting portion of the light control panel 102 (see FIG. 8) is set at T2 larger than T1, since a sufficient binocular parallax is not provided in case of having the spherical body 12 being a stereoscopic component of the stereoscopic image 10 of FIG. 1 as an object to be displayed, there is the possibility of bringing deterioration in display characteristic such as double-displayed images, but since this case is a case of having the background 11 being a planar component of the stereoscopic image 10 of FIG. 1 as an object to be displayed, no deterioration in display characteristic of the stereoscopic image 10 of FIG. 1 is brought. Therefore, in the stereoscopic display device 100 (see FIG. 8), the visual recognition can be improved while realizing a good display characteristic.

By the way, in the stereoscopic display device 100 (see FIG. 8) of this embodiment, the amount of transmitted light in a light transmitting portion (namely, optical slit 1021 of FIG. 8) of the light control panel 102 of FIG. 8 is set at different values T1 and T2 for a stereoscopic display in step S104 and a planar display in step S106, and such adjustment of the amount of transmitted light is realized by making the signal generator 103 of FIG. 8 properly generate and output the control signals corresponding to the image data 60a to 60d and the first direction background image 61a (see FIG. 7) to be used at steps S104, S106 to the light control panel 102 of FIG. 8.

Concretely, the signal generator 103 of FIG. 8 determines whether the image data 60a to 60d and the first direction background image data 61a are the data (hereinafter, stereoscopic image data) corresponding to a stereoscopic component (namely, the spherical body 12) of the stereoscopic image 10 of FIG. 1 or the data (hereinafter, planar image data) corresponding to a planar component (namely, the background 11) of the stereoscopic image 10 of FIG. 1, and according to the result of determination, generates control signals corresponding to a stereoscopic display or a planar display.

In this case, the signal generator 103 of FIG. 8 determines that the image data 60a to 60d of FIG. 7 are data of a stereoscopic image and according to this result of determination, generates a control signal for setting the amount of transmitted light of the light control panel 102 (see FIG. 8) at T1 corresponding to a stereoscopic display. And the signal generator 103 of FIG. 8 determines that the first direction background image data 61a of FIG. 7 is data of a planar image and according to this result of determination, generates a control signal for setting the amount of transmitted light of the light control panel 102 (see FIG. 8) at T2 corresponding to a planar display.

For example, using a data similarity detecting method described in detail in a second embodiment described later, it may be acceptable to perform a similarity between the image data 60a to 60d and the first direction background image data 61a (see FIG. 7) when reading the data and, based on the result of detection, determine whether the read image data 60a to 60d and the read first direction background image data 61a (see FIG. 7) are stereoscopic image data or planar image data.

And determination information for determining whether the data are stereoscopic image data or planar image data may be added to the image data 60a to 60d and the first direction background image data 61a (see FIG. 7) in advance, for example, this information may be included in a header file of each of the image data 60a to 60d and the first direction background image data 61a (see FIG. 7). Since a data similarity detection as described above is made unnecessary by adding the information to the image data 60a to 60d and the first direction background image data 61a (see FIG. 7) in advance, it is possible to reduce the system cost and perform a driving control of an optical slit 1021 (see FIG. 8) in conjunction with a more high-speed data reading operation. For example, such determination information can be written for each pixel by increasing 1 bit for 1 pixel in the image data 60a to 60d and the first direction background image data 61a (see FIG. 7).

Further, it is preferable that the opening information of an optical slit 1021 (see FIG. 8) corresponding to a light transmitting portion of the light control panel 102 of FIG. 8, namely, the information whether the opening is to be adjusted so as to set the amount of transmitted light in an optical slit 1021 of FIG. 8 at T1 corresponding to a stereoscopic display or T2 corresponding to a planar display is included in the image data 60a to 60d and the first direction background image data 61a (see FIG. 7) in advance. Thanks to this, even when the image data 60a to 60d and the first direction background image data 61a (see FIG. 7) are read at a high speed, the opening of an optical slit 1021 (see FIG. 8) can be adjusted at a high speed in conjunction with the reading operation.

Although a procedure in which step S106 of planar display is provided after step S104 of stereoscopic display is described above, step S106 of planar display and step S104 of stereoscopic display may be reversed in order. The conditions of the timing when step S106 of planar display is to be inserted, the time required for step S106 of planar display, and the like may be properly set within a range in which a good display characteristic and a good visual recognition can be realized in the stereoscopic display device 100 (see FIG. 8). For example, step S104 of stereoscopic display and step S106 of planar display are changed over from each other at a frequency equal to or higher than 15 Hertz (Hz). Due to this, it is possible to improve the external observation brightness by performing planar display of the background 11 of FIG. 1 without influencing the display of the spherical body 12 of FIG. 1 being a stereoscopic component.

Although the case of using the image data 60 of FIG. 7 is described above, the image data 60 of FIG. 6 may be used also. In case of using the image data 60 of FIG. 6, for example, the component planar image 20a of FIG. 2 may be displayed based on the image data 60a of FIG. 6, but there is the possibility that a targeted stereoscopic image 10 of FIG. 1 may be doubly displayed by plane-displaying the component planar image 20a (see FIG. 2) including the first direction spherical body image 22a of FIG. 2 corresponding to the spherical body 12 of FIG. 1 being a stereoscopic component.

Thereupon, in case of using the image data 60 of FIG. 6, it is preferable to display an image corresponding to the background of FIG. 1 being a planar component except an image corresponding to the spherical body 12 of FIG. 1 being a stereoscopic component in step S106 of planar display. Concretely, any one of the first direction background image 21a to the fourth direction background image 21d of FIGS. 2 to 5, the images each being a planar component, is displayed. Such planar display of one of the first direction background image 21a to the fourth direction background image 21d of FIGS. 2 to 5 can be realized, for example, by making the image data 60 include independently one piece of data of the first direction background image data 61a to the fourth direction background image data 61d in addition to the image data 60a to 60d, or by making the image data 60 include in advance the instruction information of using one piece of data of the first direction background image data 61a to the fourth direction background image data 61d in step S106 of planar display.

Although detailed description is omitted since this is described later in a second embodiment, for example, when the image data 60 of FIG. 6 are read in the signal generator 103, the data similarity between image data 60a to 60d (see FIG. 6) is detected for each pixel and an image that is determined to be planar image data due to its high similarity, namely, one of the first direction background image 21a to the fourth direction background image 21d may be displayed in step S106 of planar display.

EXAMPLE 1

Figure 10:
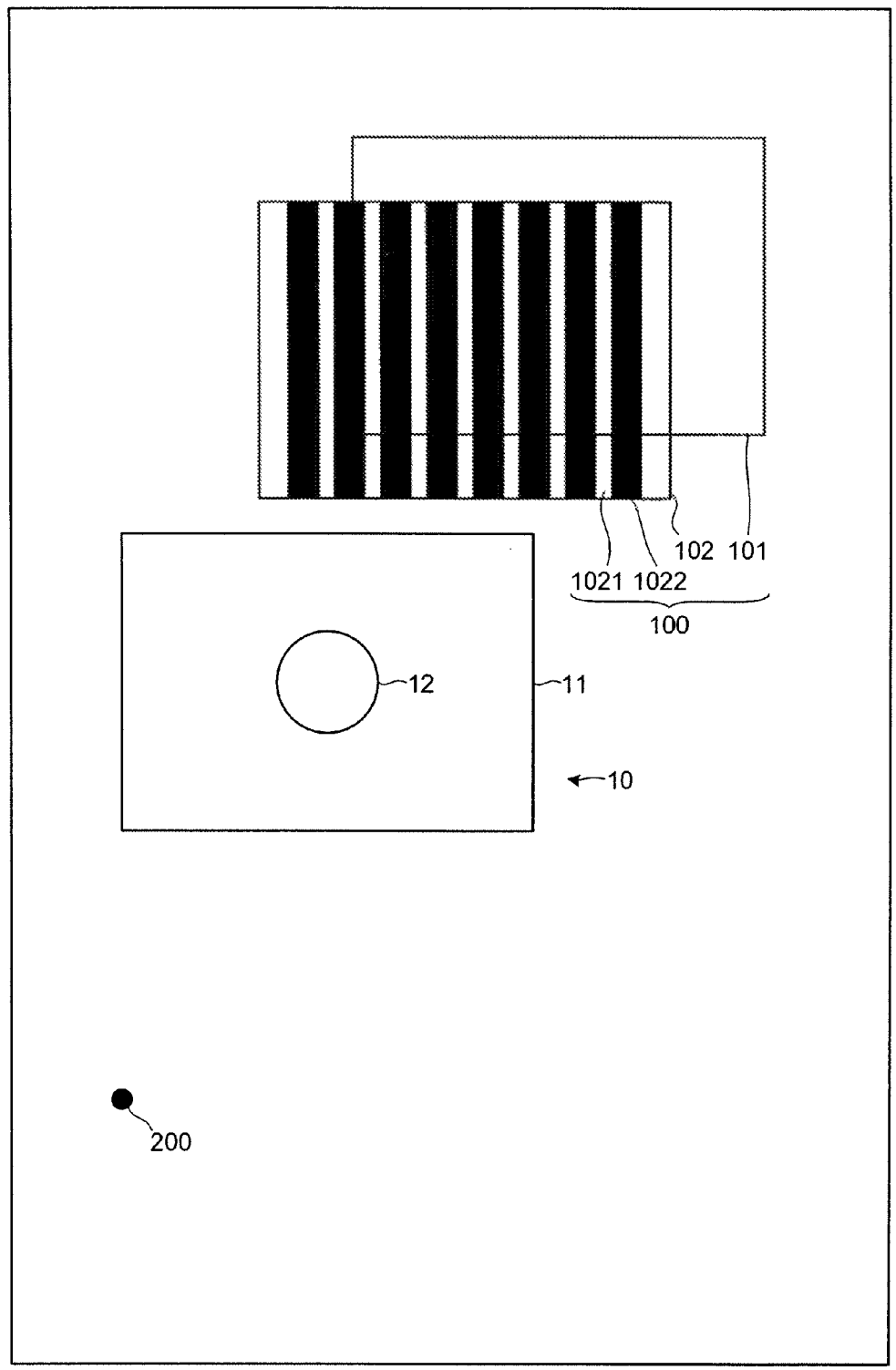
FIG. 10 is a schematic diagram showing an aspect of a stereoscopic-display operation of the stereoscopic display device according to the first embodiment of the present invention.
Figure 11:
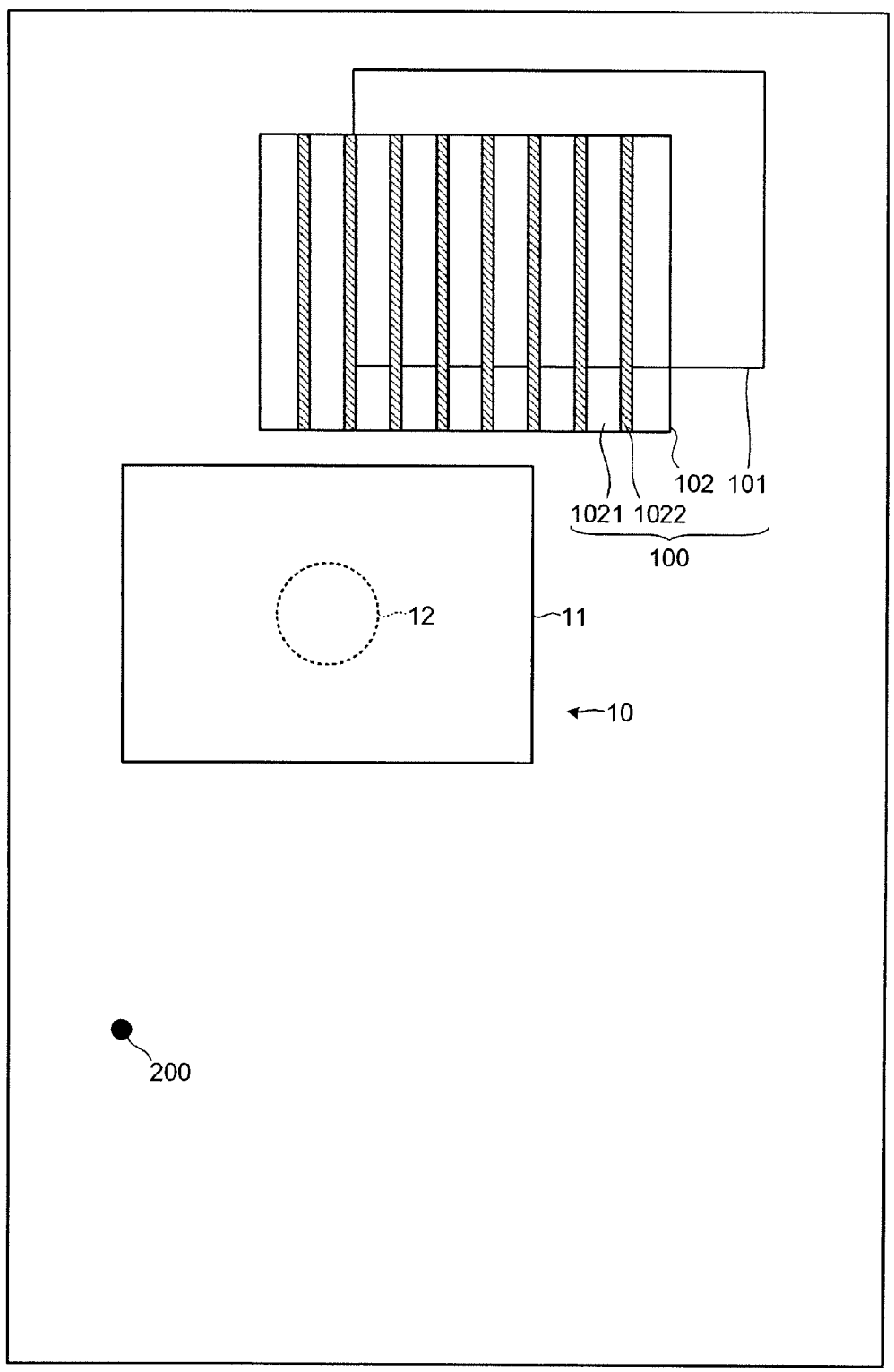
FIG. 11 is a schematic diagram showing an aspect of a planar-display operation of the stereoscopic display device according to the first embodiment of the present invention.

Next, a concrete aspect of the first embodiment is described with reference to the following example. FIGS. 10 and 11 are schematic diagrams for explaining an outline of a displaying operation of a stereoscopic display device of example 1. An aspect of a stereoscopic-display operation is illustrated as shown in FIG. 10 and an aspect of a planar-display operation is illustrated as shown in FIG. 11.

As shown in FIG. 10, in a stereoscopic display device 100 of this example, first the image data 60a to 60d of FIG. 7 being data of a stereoscopic image are read in the signal generator 103 (step S102 of FIG. 9), and an optical slit 1021 is properly formed at a desired position in the optical slit member 1022 of the light control panel 102 of FIG. 8 according to the information of the read image data 60a to 60d (see FIG. 7) (step S103 of FIG. 9). And the image data 60a to 60d (see FIG. 7) read from the signal generator 103 of FIG. 8 are output to the display panel 101 and the component planar image 20a to 20d of FIGS. 2 to 5 are successively displayed on the display panel 101.

In the stereoscopic display device 100 of this example, under such a situation a stereoscopic display is performed based on an MPS-IP method similar to Patent Document 1 (Japanese Patent Laid-Open Publication No. H6-160,770) (step S104 of FIG. 9). Thereby, a user (observer) 200 can observe a stereoscopic image 10 composed of a background 11 being a planar component and a spherical body 12 being a stereoscopic component. Here, the amount of transmitted light of a light transmitting portion (namely, optical slit 1021) of the light control panel 102 at the time of such a stereoscopic display (step S104 of FIG. 9) is T1.

After the stereoscopic display (step S104 of FIG. 9), as shown in FIG. 11, a planar display (step S106 of FIG. 9) is performed and only the background 11 of the stereoscopic image 10 is displayed. Concretely optical slits 1021 are formed all over the optical slit member 1022 of the light control panel 102 according to the information of the first direction background image data 61a of FIG. 7 being planar image data read in the signal generator 103 of FIG. 8 (step S105 of FIG. 9). And the first direction background image data 61a read from the signal generator 103 of FIG. 8 are output to the display panel 101 and the first direction background image 21a of FIG. 2 is displayed on the display panel 101.

And only the background 11 being a planar component of the stereoscopic image 10 is plane-displayed (step S106 of FIG. 9) by a user 200's observing the first direction background image 21a (see FIG. 2) on the display panel 101 through the light control panel 102 being in a fully opened state. The amount of transmitted light of a light transmitting portion (namely, optical slit 1021) of the light control panel 102 at the time of such planar display (step S106 of FIG. 9) is T2 larger than the amount of transmitted light T1 in the stereoscopic display (step S104 of FIG. 9).

Figure 12:
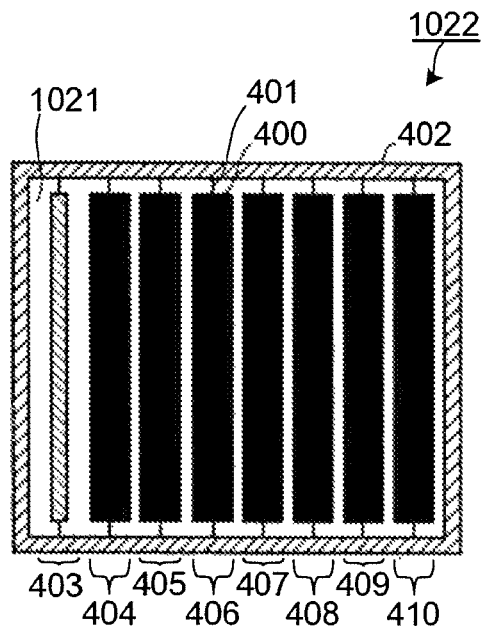
FIG. 12 is a schematic diagram for explaining a composition and an operation of an optical slit member of the stereoscopic display device according to the first embodiment of the present invention.
Figure 13:
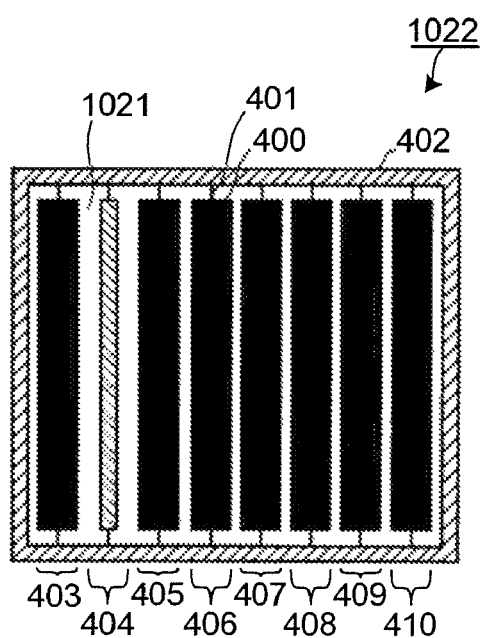
FIG. 13 is a schematic diagram for explaining a composition and an operation of an optical slit member of the stereoscopic display device according to the first embodiment of the present invention.
Figure 14:
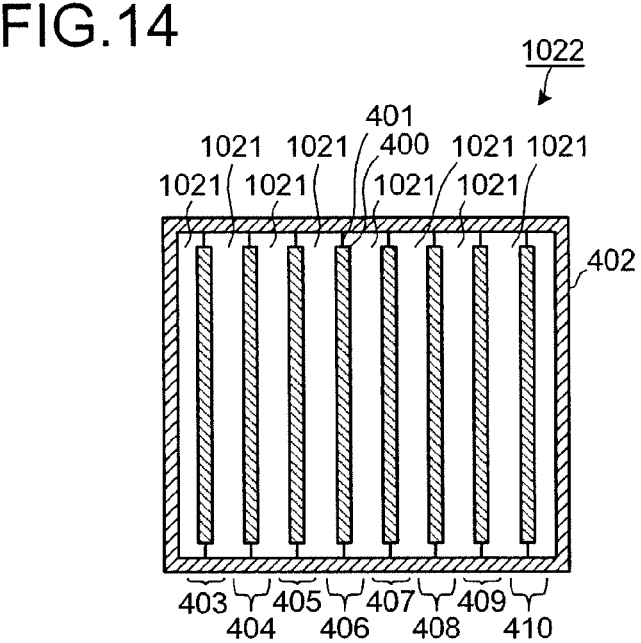
FIG. 14 is a schematic diagram for explaining a composition and an operation of an optical slit member of the stereoscopic display device according to the first embodiment of the present invention.

FIGS. 12 to 14 are schematic diagrams showing the composition and operation of the optical slit member 1022 of the stereoscopic display device 100 of FIGS. 10 and 11. As shown in FIGS. 12 to 14, the light control panel 102 (see FIG. 10) of the stereoscopic display device 100 (see FIG. 10) of this example has an optical slit member 1022 composed of a plurality of shutter plates 400 each being composed to be controllable so as to be opened and closed independently of one another.

Concretely, each of the shutter plates 400 is formed of a rectangular plate made of an opaque material and is attached to a frame 402 through supporting shafts 401 projecting from both ends of it in the longitudinal direction. Each of the shutter plates 400 is driven by an optical slit driver 1023 of FIG. 8 and is turned around the supporting shaft 401 independently of each other. Each shutter plate 400 is arranged so that the longitudinal direction of it coincides with the vertical direction of the display panel 101 (see FIG. 10), and is arranged along the horizontal direction of the display panel 101 so as to form a minute gap for turning between it and an adjacent shutter plate 400 of it.

As described above, an optical slit driver 1023 of FIG. 8 for driving each shutter plate 400 is controlled by a control signal output from the signal generator 103 of FIG. 8. And an optical slit 1021 can be formed at a specified position of the optical slit member 1022 by a fact that the optical slit driver 1023 of FIG. 8 controls a turning operation of each shutter plate 400 of the optical slit member 1022 based on a control signal from the signal generator 103 of FIG. 8.

Here, in the optical slit member 1022, a state where the display surface of the display panel 101 (see FIG. 10) disposed at the rear and the main surface of a shutter plate 400 are nearly in parallel with each other is determined as a closed state of the shutter plate 400. When shutter plates 400 are in a closed state, as shown in areas 404 to 410 of FIG. 12 for example, the main surfaces of the shutter plates 400 are observed by a user 200 (see FIG. 10). Therefore, in such a state no optical slits 1021 are formed in the areas 404 to 410 and hence an image displayed on the display panel 101 (see FIG. 10) disposed at the rear cannot be observed.

A minute gap for turning is formed as described above between adjacent shutter plates 400 being in a closed state and can be strictly a light transmitting portion, but in this case such a gap is distinguished from an optical slit 1021 intentionally formed as a light transmitting portion and is not called an optical slit 1021.

On the other hand, a state where the display surface of the display panel 101 (see FIG. 10) disposed at the rear and the main surface of a shutter plate 400 are nearly perpendicular to each other is determined as an opened state of the shutter plate 400. That is, when a shutter plate is in an opened state, a side face of the shutter plate 400 is observed by a user 200 (see FIG. 10), as shown in area 403 of FIG. 12. When a shutter plate 400 comes into such an opened state, an optical slit 1021 to be a light transmitting portion is formed in the optical slit member 1022. Therefore, an image displayed on the display panel 101 can be observed through the formed optical slit 1021.

Hereupon, in the stereoscopic display device 100 (see FIG. 10) of this example, it is necessary to move a position where an optical slit 1021 is formed synchronously with update of an image in the display panel 101 (see FIG. 10) at the time of performing a stereoscopic display in step S104 of FIG. 9, and the image update of the display panel 101 (see FIG. 10) is performed at a high speed. Therefore, a shutter plate 400 forming the optical slit member 1022 has a requirement of opening and closing at a high speed. In view of such a point, a shutter plate 400 of an optical slit member 1022 is formed out of, for example, ceramic of a piezoelectric control type making a high-speed opening and closing operation realizable.

Since the image update is performed at a high speed, here an organic EL display panel capable of realizing a high-speed response is used as the display panel 101 (see FIG. 10) of the stereoscopic display device 100 (see FIG. 10). However, a display panel other than an organic EL display panel may be used the other display panel being capable of realizing a high-speed response being able to cope with the image update.

The stereoscopic display device 100 (see FIG. 10) of this example realizes a stereoscopic display of the background 11 and the spherical body 12 of the stereoscopic image 10 as shown in FIG. 10 in step S104 of FIG. 9 by changing (namely, moving) the position where an optical slit 1021 is formed in the optical slit member 1022, and such change of the position where an optical slit 1021 is formed is realized by opening and closing shutter plates 400 forming the optical slit member 1022 as shown in FIGS. 12 and 13.

That is, the optical slit driver 1023 of FIG. 8 controls turning operations of shutter plates 400 of the optical slit member 1022 by control signals output from the signal generator 103 of FIG. 8, makes only a shutter plate 400 being at a specified position come into an opened state, and moves the position to come into this opened state in order. Such an operation of a shutter plate 400 is performed synchronously with the image update in the display panel 101 (see FIG. 10).

For example, based on a control signal output from the signal generator 103 of FIG. 8, as shown in FIG. 12, the optical slit member 1022 first opens a shutter plate 400 in a domain 403 located at an end of the optical slit member 1022 and closes shutter plates 400 in the other domains 404 to 410. Thereby, an optical slit 1021 is formed in domain 403. At this time, an image corresponding to the optical slit 1021 formed in domain 403 is displayed on the display panel 101 of FIG. 10 and this image is observed through the optical slit 1021.

Subsequently, as shown in FIG. 13, the optical slit member 1022 opens a shutter plate 400 in domain 404 adjacent to domain 403 and closes the shutter plates 400 in the other domains 403 and 405 to 410. Thereby, an optical slit 1021 is formed in domain 404. At this time, an image corresponding to the optical slit 1021 formed in domain 404 is displayed on the display panel 101 of FIG. 10 and this image is observed through the optical slit 1021.

In such a way, according to a fact that the shutter plates 400 are opened and closed in order in the domains 403 to 410 of the optical slit member 1022, an optical slit 1021 is formed in order in domains 403 to 410. Thereby, a structure in which the position of an optical slit 1021 is selectively changed in order and the image update is performed synchronously with this position change of an optical slit 1021. As a result, the stereoscopic image 10 is displayed by an MPS-IP method as shown in FIG. 10.

On the other hand, at the time of the planar display (see FIG. 10) in step S106 of FIG. 9, as shown FIG. 14, the optical slit driver 1023 of FIG. 8 controls turning operations of shutter plates 400 of the optical slit member 1022 by control signals output from the signal generator 103 of FIG. 8, and makes the shutter plates 400 in all domains 403 to 410 of the optical slit member 1022 come into an opened state. Thereby, optical slits 1021 are formed in all domains 403 to 410 of the optical slit member 1022. And as shown in FIG. 11, only the background 11 of the stereoscopic image 10 is obtained by a user 200's observing an image on the display panel 101 through these optical slits 1021.

The stereoscopic display (step S104 of FIG. 9) realized by an opening operation of optical slits 1021 shown in FIGS. 12 and 13 and the planar display (step S106 of FIG. 9) realized by an opening operation of optical slits 1021 shown in FIG. 14 are made to coexist under a condition within a range in which the display characteristics of the targeted stereoscopic image 10 of FIG. 1 are not deteriorated. For example, here, step S104 of stereoscopic display and step S106 of planar display of FIG. 9 are changed over from each other at a frequency equal to or higher than 15 Hz. Due to this, it is possible to suppress the influence of planar display on the spherical body 12 (see FIG. 10) being a stereoscopic component.

In the displaying operation of the stereoscopic display device 100 (see FIG. 10) as described above, the optical slit 1021 is formed in only one domain out of eight domains 403 to 410 in the stereoscopic display of step S104 of FIG. 9 as shown in FIGS. 12 and 13, but on the other hand the optical slits 1021 are formed in all of the eight domains 403 to 410 in the planar display of step S106 of FIG. 9 as shown in FIG. 14. Therefore the external observation brightness of planar display is eight times higher than the external observation brightness of stereoscopic display with respect to the opening area of optical slits 1021.

In the stereoscopic display device 100 (see FIG. 10) making a stereoscopic display being lower in external observation brightness and a planar display being higher in external observation brightness coexist by changing over them from each other with the lapse of time in such a way, the external observation brightness is improved as a whole thanks to coexistence of planar display. As a result, a good visual recognition and good display characteristics can be realized in displaying the targeted stereoscopic image 10 of FIG. 1.

In the stereoscopic display device 100 (see FIG. 10), the read image data 60*a* to 60*d* and the read first direction background image data 61*a* are determined to be either stereoscopic image data or planar image data and based on the result of determination, a proper operation out of a stereoscopic-display operation shown in FIGS. 12 and 13 and a planar-display operation shown in FIG. 14 is automatically selected and performed in the light control panel 102 (see FIG. 10). Therefore, the effect can be obtained without requiring a user 200's (see FIGS. 10 and 11) intentional operation.

EXAMPLE 2

Figure 15:
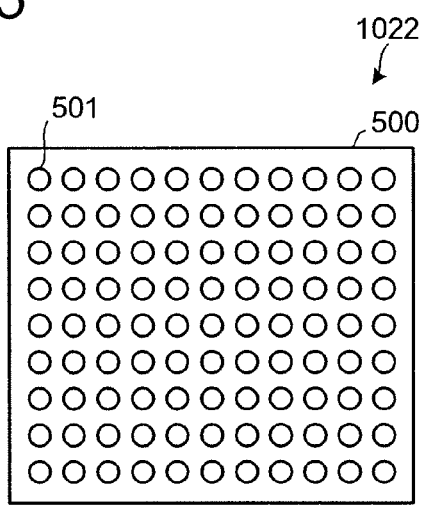
FIG. 15 is a schematic diagram for explaining a composition and an operation of an optical slit member of the stereoscopic display device according to the second embodiment of the present invention.
Figure 16:
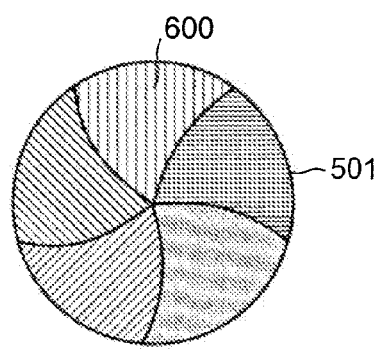
FIG. 16 is a schematic, partial, magnified and sectional view showing the composition of a pinhole of the optical slit member of FIG. 15.

In example 2, a stereoscopic display device having an optical slit member including pinholes each opening of which can be opened and closed by a shutter is described. FIG. 15 is a schematic plan view showing the composition of an optical slit member of a stereoscopic display device according to example 2 of the present invention. FIG. 16 is a schematic, partial and magnified view showing the composition of a pinhole 501 of the optical slit member 1022 of FIG. 15.

As shown in FIG. 15, the optical slit member 1022 forming the panel body of a light control panel 102 (see FIG. 8) has a structure in which a plurality of pinholes 501 each being a circular opening having a specified diameter are arranged at specified intervals in a panel base member 500 made of a non-transmissible material. As shown in FIG. 16, a movable pinhole shutter 600 for opening and closing an opening is provided in a pinhole 501. The pinhole shutter 600 is formed, for example, by combining with one another a plurality of plate members that are formed so as to be capable of advancing and retreating and that are capable of freely appearing and disappearing in the opening of the pinhole 501.

Although not illustrated here, a housing for plate members forming a pinhole shutter 600 is provided in the periphery of a pinhole 501 in the panel base member 500. The pinhole 501 is made to come into an opened state (namely, a transmissible state) by making the plate members of the pinhole shutter 600 retreat from the opening of the pinhole 501 to store them into this housing. And when the plate members of the pinhole shutter 600 are discharged from the housing and advance toward the center of the pinhole 501, the opening of the pinhole 501 is closed by the plate members of the pinhole shutter 600 and thereby the pinhole 501 comes into a closed state (namely, a non-transmissible state). In such a way, in this example, a pinhole 501 corresponds to a light transmitting portion in the light control panel 102 (see FIG. 8).

An advancing and retreating operation of the pinhole shutter 600 is controlled by a control signal output from the signal generator 103 of FIG. 8, and each of the pinholes 501 is independently controlled to open and close. Similarly to example 1, here the signal generator 103 of FIG. 8 determines whether image data taken from the memory unit 1033 (see FIG. 8) are stereoscopic image data or planar image data, and according to the result of determination a control signal corresponding to stereoscopic display or planar display is generated and output to the light control panel 102 (see FIG. 8). And the opening and closing of the pinhole 501 is controlled by controlling the optical slit driver 1023 based on this control signal.

Next, a displaying operation of this example is described. First, describing an outline of it, in a stereoscopic display in step S104 of FIG. 9, a plurality of pinholes 501 being usually in a closed state are selectively made to come into an opened state in order and an image corresponding to the pinhole 501 made to be in an opened state is displayed on the display panel 101. Thereby, similarly to example 1, a stereoscopic display is realized by an MPS-IP method and a stereoscopic image 10 of FIG. 1 composed of a background 11 and a spherical body 12 is obtained. On the other hand, in a planar display in step S106 of FIG. 9, all of the pinholes 501 come into an opened state and an image on the display panel 101 is observed through these pinholes 501 and only the background 11 of FIG. 1 is obtained. And an effect similar to example 1 is obtained by making the stereoscopic display and the planar display coexist through changing over them from each other with the lapse of time.

Figure 17:
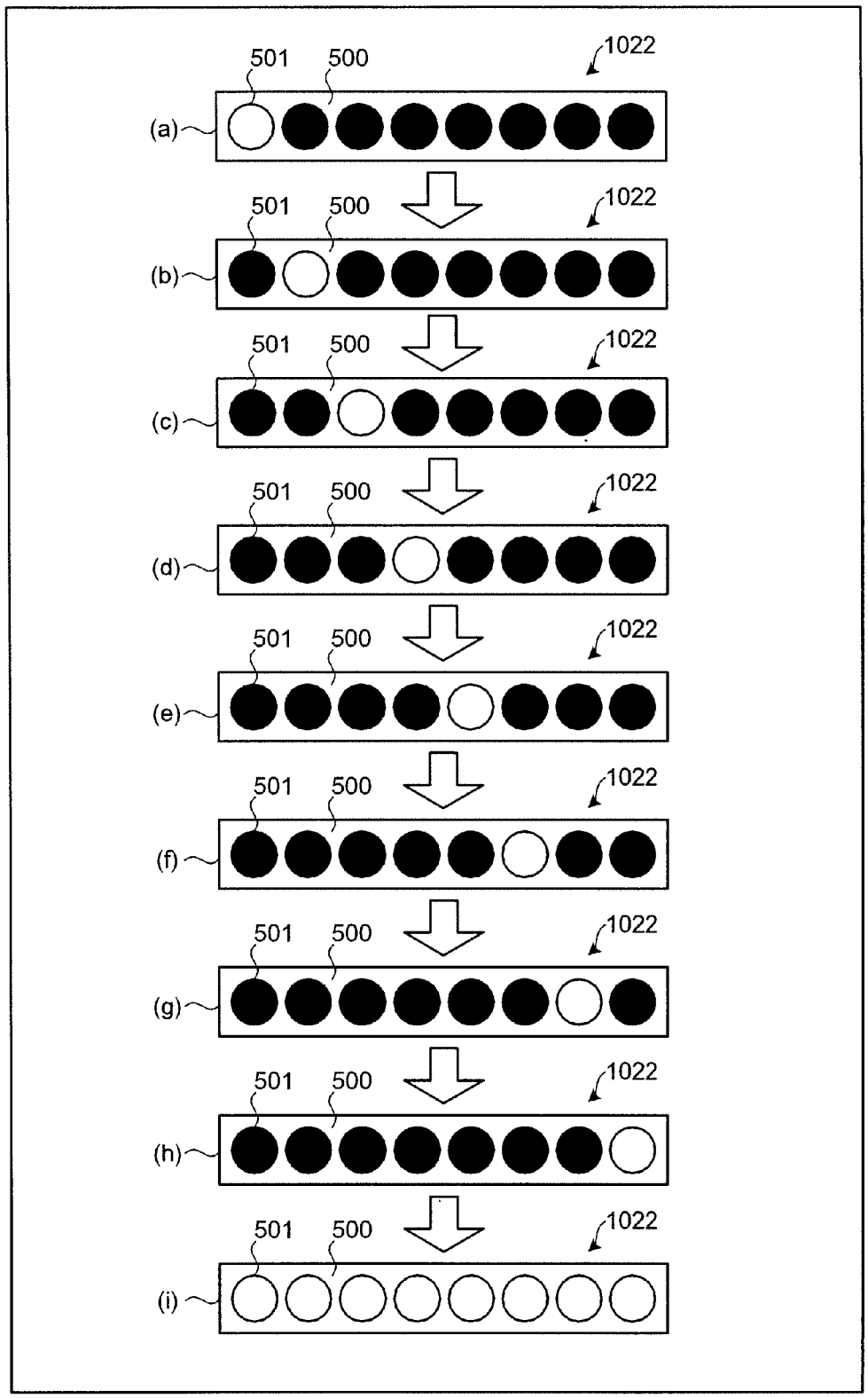
FIG. 17 is a schematic diagram showing a principle of a displaying operation of a stereoscopic display device according to a second embodiment of the present invention.

FIGS. 17(*a*) to (*i*) are schematic diagrams for explaining a principle of a displaying operation of example 2, and a part of pinholes 501 arranged in the horizontal direction of the optical slit member 1022 shown in FIG. 15 is extracted and illustrated as shown in FIG. 17(*a*) to (*i*). A solid-white pinhole 501 in this figure shows a state where a pinhole shutter 600 (see FIG. 16) retreats from the opening of the pinhole 501, namely, an opened state. On the other hand, a black pinhole 501 shows a state where a pinhole shutter 600 (see FIG. 16) closes the opening of the pinhole 501, namely, a closed state.

FIGS. 17(*a*) to (*h*) show a stereoscopic-display operation by an MPS-IP method performed in step S104 of FIG. 9. In step S104 of FIG. 9, a plurality of pinholes 501 formed in the panel base member 500 of the optical slit member 1022 are selectively made to come into an opened state in order. Such a selective opening and closing operation of pinholes 501 is performed synchronously with image update in the display panel 101 (see FIG. 8) and an image corresponding to a pinhole 501 being selectively in an opened state is displayed on the display panel 101 (see FIG. 8). Thereby, a stereoscopic display is realized by an MPS-IP method and a stereoscopic image 10 of FIG. 1 composed of a background 11 and a spherical body 12 is obtained. In such a stereoscopic display in step S104 (see FIG. 9), the amount of transmitted light of the optical slit member 1022 is T1.

On the other hand, as shown in FIG. 17(*i*) a planar-display operation performed in step S106 of FIG. 9 is illustrated. In step S106 of FIG. 9, a plurality of pinholes 501 of the optical slit member 1022 are all made to come into an opened state. Thereby, a planar display is realized and the background 11 of FIG. 1 is obtained. In such a planar display in step S106 (see FIG. 9), the amount of transmitted light T2 of the optical slit member 1022 is larger than the amount of transmitted light T1 in the stereoscopic display in step S104 (see FIG. 9) shown in FIGS. 17(*a*) to (*i*).

As described above, since this example performs a planar display through making the amount of transmitted light in the optical slit member 1022 large as T2 after performing a stereoscopic display through making the amount of transmitted light in the optical slit member 1022 small as T1, it is possible to realize a structure in which a stereoscopic display and a planar display coexist similarly to example 1. Therefore, in this example an effect similar to example 1 is obtained.

Although the description exemplifies the case of bringing all pinholes 501 into an opened state as shown in FIG. 17(*i*) in planar display in step S106 of FIG. 9, not all but part of pinholes 501 may be brought into an opened state if the amount of transmitted light T2 can be made larger than the amount of transmitted light T1 in stereoscopic display in step S104 of FIG. 9.

Although the description exemplifies the case of performing a planar display through performing an opening and closing operation of pinholes 501 shown in FIG. 17(*i*) after performing a stereoscopic display through performing an opening and closing operation of pinholes 501 shown in FIGS. 17(*a*) to (*h*), namely, the case of performing independently an opening and closing operation for stereoscopic display and an opening and closing operation for planar display, an opening and closing operation for planar display may be included in the course of an opening and closing operation for stereoscopic display. For example, it is acceptable also that after opening and closing operations shown in FIGS. 17(*a*) to (*c*), an opening and closing operation shown in FIG. 17(*i*) is performed and then opening and closing operations as shown in FIGS. 17(*d*) to (*h*) are performed again.

EXAMPLE 3

Although the case of performing a stereoscopic display by an MPS-IP method is described in example 1 and example 2 described above, the present invention is applicable also to the case of performing a stereoscopic display by a conventional IP method. The following description exemplifies the case of performing a stereoscopic display by a conventional IP method.

Figure 18:
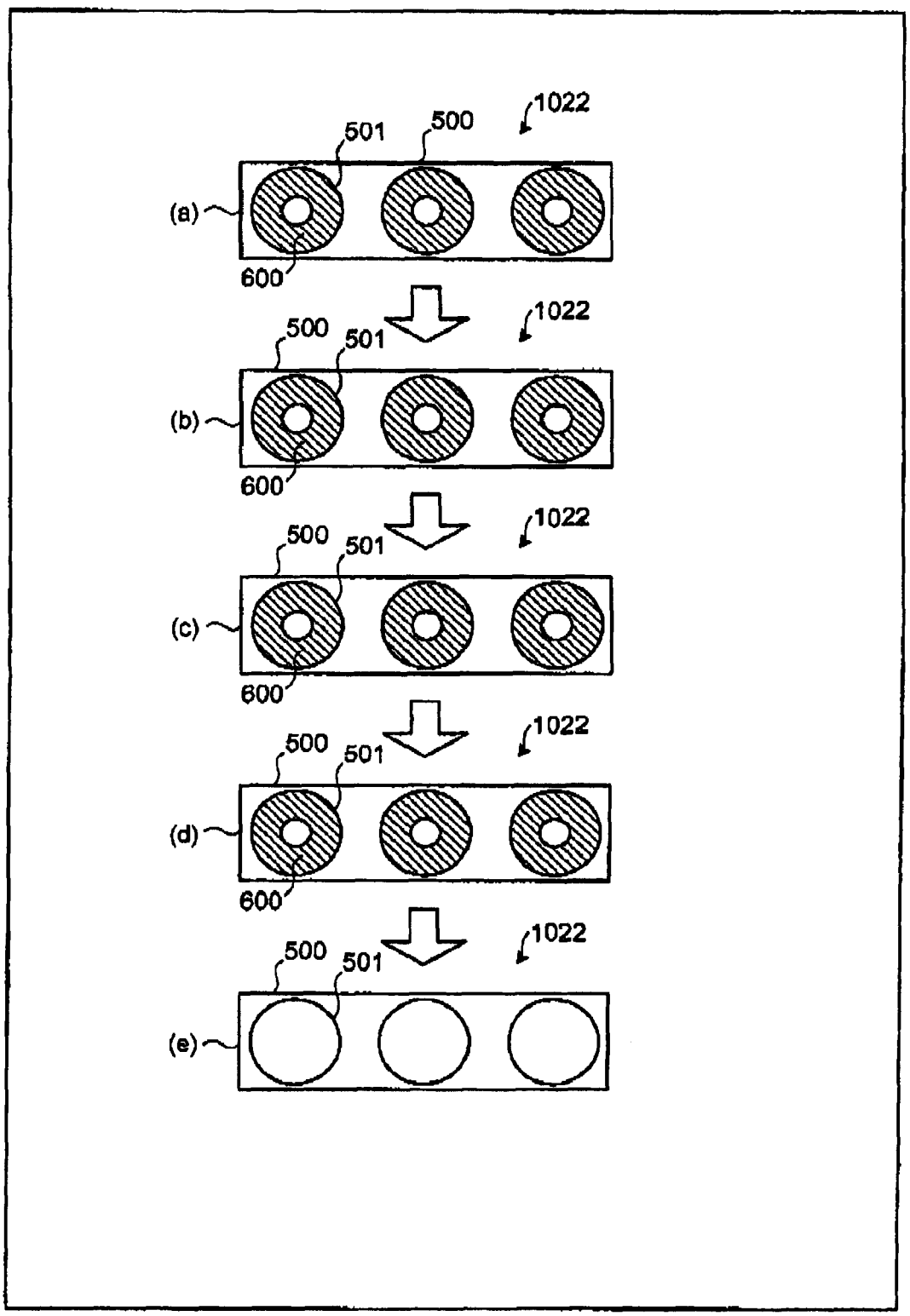
FIG. 18 is a schematic diagram showing a principle of a displaying operation of a stereoscopic display device according to a third embodiment of the present invention.

FIGS. 18(*a*) to (*e*) are schematic diagrams for explaining a principle of a displaying operation in example 3 of the present invention, and extract and show part of pinholes 501 arranged in the horizontal direction of the optical slit member 1022 shown in FIG. 15. Since the structure of the optical slit member 1022 of a stereoscopic display device of this example is the same as the structure of the optical slit member 1022 of example 2 described above and shown in FIGS. 15 and 16, the description and illustration of it are omitted here.

In this example, in stereoscopic display in step S104 of FIG. 9 the shutters 600 of all pinholes 501 of the optical slit member 1022 (see FIG. 15) are opened by a specified amount as shown in FIGS. 18(*a*) to (*d*). Thereby, the amount of transmitted light of the optical slit member 1022 is adjusted to T1. And the component planar images 20*a* to 20*d* shown in FIGS. 2 to 5 are displayed on the display panel 101 (see FIG. 8) in such an opened state of the pinholes 501. Thereby, a stereoscopic display is realized by an IP method and a stereoscopic image 10 of FIG. 1 composed of a background 11 and a spherical body 12 is obtained.

After the stereoscopic display, in step S105 of FIG. 9, all the pinholes 501 of the optical slit member 1022 are fully opened as shown in FIG. 18(*e*). Thereby, the amount of transmitted light of the optical slit member 1022 is adjusted to T2 larger than the amount of transmitted light T1 in the stereoscopic display shown in FIGS. 18(*a*) to (*d*). And the first direction background image 21*b* of FIG. 2 is displayed on the display panel 101 (see FIG. 8) in such an opened state of the pinholes 501. Thereby, a planar display of the first direction background image 21*b* of FIG. 2 is realized and the background 11 of FIG. 1 is obtained.

As described above, in the stereoscopic display device 100 of this example, since a stereoscopic display making the amount of transmitted light in the optical slits 1021 small as T1 and a planar display making the amount of transmitted light in the optical slits 1021 large as T2 coexist, an effect similar to the effect described in example 1 is obtained.

An opened state of pinholes 501 in planar display is not limited to the opened state shown in FIG. 18(*e*) but an opened state other than this is acceptable if it can realize the amount of transmitted light T2 larger than the amount of transmitted light T1 of the optical slit member 1022 in stereoscopic display.

Although the description exemplifies the case of performing a planar display through performing an opening and closing operation of pinholes 501 shown in FIG. 18(*e*) after performing a stereoscopic display through performing an opening and closing operation of pinholes 501 shown in FIGS. 18(*a*) to (*d*), namely, the case of performing independently an opening and closing operation for stereoscopic display and an opening and closing operation for planar display, an opening and closing operation for planar display may be included in the course of an opening and closing operation for stereoscopic display. For example, it is acceptable also that after opening and closing operations shown in FIGS. 18(*a*) and (*b*), an opening and closing operation shown in FIG. 18(*e*) is performed and then opening and closing operations as shown in FIGS. 18(*c*) and (*d*) are performed again.

Although this example exemplifies the case of providing an optical slit member 1022 (see FIG. 15) including pinholes 501, a system performing a stereoscopic display by a conventional IP method is applicable also in a stereoscopic display device 100 (see FIG. 10) including an optical slit member 1022 provided with shutter plates 400 like example 1.

EXAMPLE 4

Although the case in which an opening (namely, a light transmitting portion) of an optical slit 1021 (see FIG. 12) or a pinhole 501 (see FIG. 16) of a light control panel 102 (see FIG. 8) is opened and closed by a shutter plate 400 (see FIG. 12) or a pinhole shutter 600 (see FIG. 16) being a movable shielding member is described in examples 1 to 3 described above, a stereoscopic display device according to the present invention can use also a mechanism performing a similar function to a physical opening and closing function by controlling the optical transmissibility of a material forming a light transmitting portion, concretely, controlling the optical transmissibility of a light transmitting portion utilizing a polarizing characteristic of a liquid crystal material forming the light transmitting portion made of the liquid crystal material, instead of physically opening and closing a light transmitting portion by a movable shielding member.

Figure 19:
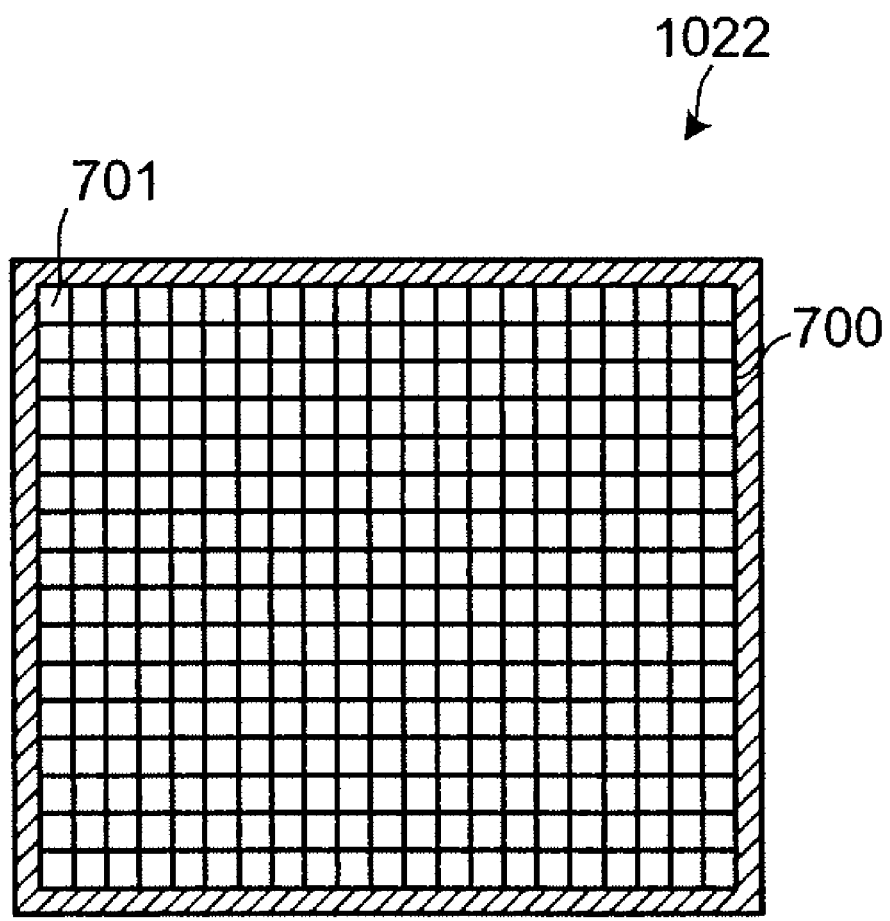
FIG. 19 is a schematic plan view showing the composition of an optical slit member of a stereoscopic display device according to a fourth embodiment of the present invention.

In example 4, a stereoscopic display device having a light transmitting portion made of a liquid crystal material is described. FIG. 19 is a schematic plan view showing the structure of an optical slit member in example 4 of the present invention. As shown in FIG. 19, an optical slit member 1022 of this example is formed by a liquid crystal panel 700 composed of a pair of substrates disposed facing each other and a liquid crystal layer interposed between them. The liquid crystal panel 700 has a structure having a plurality of unit cells 701 arranged in the shape of a matrix. In this case, each of the unit cells 701 corresponds to a light transmitting portion of the optical slit member 1022.

Each unit cell 701 of the liquid crystal panel 700 has a liquid crystal layer usually set in polarization so as to be incapable of transmitting light. And it is made to be capable of transmitting light by changing the polarization of the liquid crystal layer at a specified time. Here, it is determined that a unit cell 701 being capable of transmitting light is in an opened state and a unit cell 701 being incapable of transmitting light is in a closed state. Similarly to example 1, in the liquid crystal panel 700, it is necessary to change the optical transmissibility of a unit cell 701 synchronously with an image on the display panel 101 (FIG. 8) being updated at a high speed at the time of stereoscopic display in step S104 of FIG. 9. Therefore, the liquid crystal panel 700 forming the optical slit member 1022 is made of a liquid crystal material capable of performing a high-speed response, for example, a ferroelectric liquid crystal material.

A polarization control operation in each unit cell 701 of the liquid crystal panel 700 is controlled by a control signal output from the signal generator 103 of FIG. 8, and the polarization is controlled independently for each unit cell 701. Here, similarly to example 1, the signal generator 103 of FIG. 8 determines whether image data taken from the memory unit 1033 (see FIG. 8) are data of a stereoscopic image or data of a planar image, and according to the result of determination a control signal corresponding to a stereoscopic display or a planar display is generated and output to the light control panel 102 (see FIG. 8). And each unit cell 701 is controlled in polarization by controlling an optical slit driver 1023 based on this control signal. As a result, it is possible to adjust the respective unit cells 701 in polarization independently of each other and make each unit cell 701 come into an opened or closed state desired.

Next, a displaying operation in this example is described. In this example, a stereoscopic display in step S104 of FIG. 9 and a planar display in step S106 of FIG. 9 are performed according to a similar principle to the displaying operation in example 2. That is, in the stereoscopic display in step S104 of FIG. 9, a plurality of unit cells 701 being usually in a closed state (namely, being incapable of transmitting light) are selectively made to come into an opened state (namely, be capable of transmitting light) in order as shown in FIGS. 17(a) to (h), and the amount of transmitted light of a light transmitting portion (namely, a unit cell 701) in the optical slit member 1022 becomes T1. Thereby, a stereoscopic display is realized by an MPS-IP method, and a stereoscopic image 10 of FIG. 1 composed of a background 11 and a spherical body 12 is obtained.

On the other hand, in a planar display performed in step S106 of FIG. 9, as shown in FIG. 17(i) all of unit cells 701 are made to come into an opened state (be capable of transmitting light), and the amount of transmitted light of a light transmitting portion (namely, a unit cell 701) in the optical slit member 1022 becomes T2 larger than the amount of transmitted light T1 in stereoscopic display. Thereby, similarly to example 2, a planar display is realized and the background 11 of FIG. 1 is obtained.

As described above, since the stereoscopic display device 100 of this example realizes a structure in which a stereoscopic display being small as T1 in amount of transmitted light in the optical slit member 1022 and a planar display being large as T2 in the optical slit member 1022 are made to coexist by being changed over from each other with the lapse of time, the same effect as described in example 2 is obtained.

Second Embodiment

Figure 20:
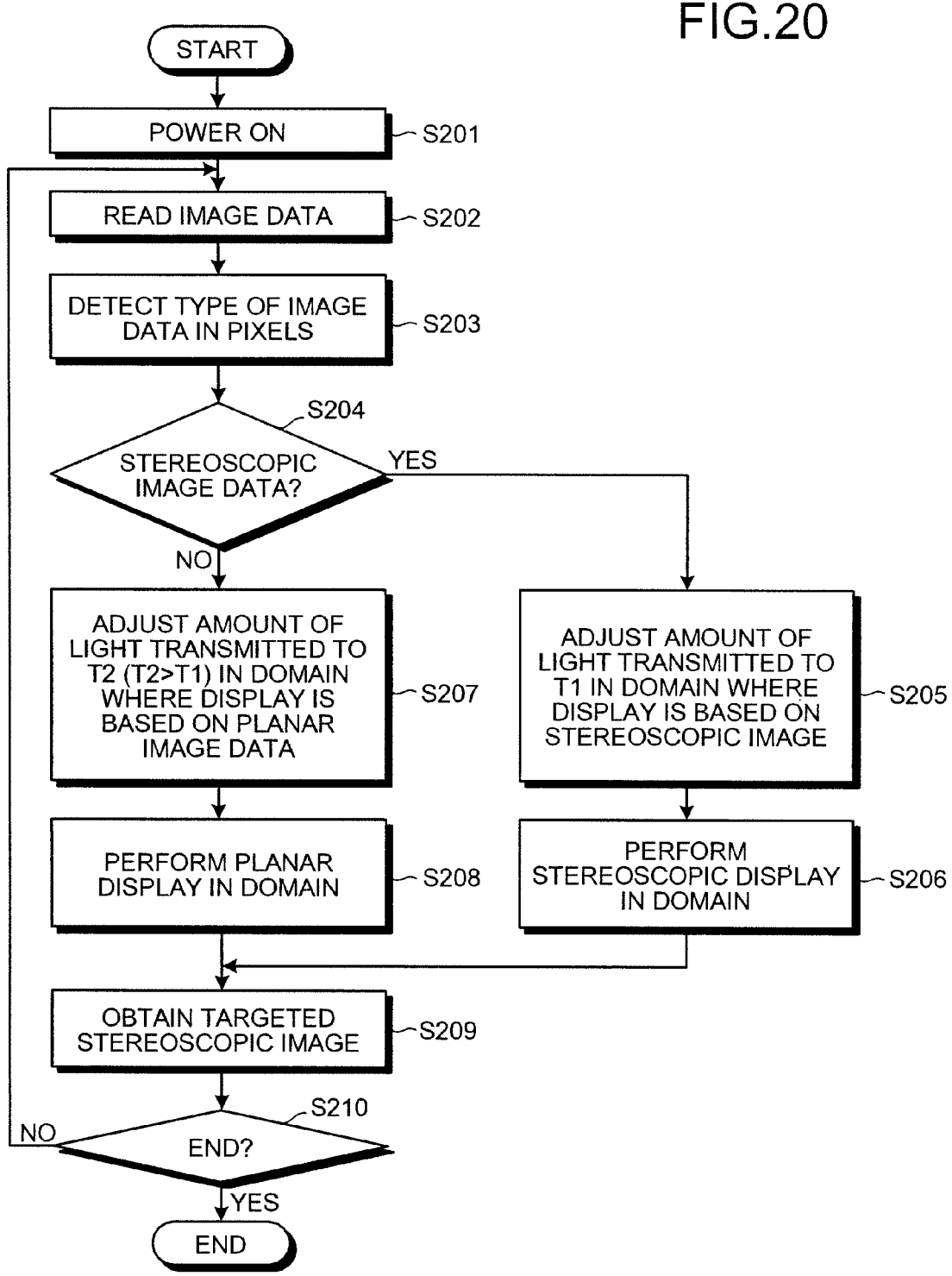
FIG. 20 is a flow chart showing an outline of a displaying operation of the stereoscopic display device according to the second embodiment of the present invention.

FIG. 20 is a flowchart showing an outline of a displaying operation in a stereoscopic display device according to a second embodiment of the present invention. A stereoscopic display device of this embodiment has a composition similar to the stereoscopic display device 100 of the first embodiment shown in FIG. 8, and therefore detailed descriptions are omitted here.

First, an outline of a characteristic composition of a displaying operation in the stereoscopic display device of this embodiment is described. Although the case of changing over a stereoscopic display and a planar display from each other with the lapse of time is described in the stereoscopic display device 100 (see FIG. 8) of the first embodiment described above, this embodiment has a composition in which a stereoscopic display and a planar display are changed over from each other in each domain of a display surface of the stereoscopic display device.

That is, in this embodiment, a stereoscopic display is performed in some domains of the display surface of the stereoscopic display device and a planar display is performed in the other domains of the display surface at the same time as this stereoscopic display. Hereupon, the display surface of the stereoscopic display device is concretely a panel surface at the observer side of a light control panel 102 (see FIG. 10) disposed between a user 200 (see FIG. 10) and a display panel 101 (see FIG. 10).

A displaying operation in this embodiment is concretely described in the following. First, as shown in FIG. 20, when a stereoscopic display device is started by turning on a power source of it (step S201), image data 60a to 60d of FIG. 6 are read from a memory unit 1033 (see FIG. 8) of a signal generator 103 of FIG. 8 (step S202). And these image data 60a to 60d (see FIG. 6) are output to a display panel 101 (see FIG. 8).

The information of the read image data 60a to 60d (see FIG. 6) is read by the signal generator 103 of FIG. 8 and according to the read information a control unit 1031 (see FIG. 8) of the signal generator 103 (see FIG. 8) detects in pixels the kind of the image data 60a to 60d, namely, whether the image data 60a to 60d are stereoscopic image data or planar image data (step S203). And based on the result of detection, the control unit determines for each pixel whether each of image data 60a to 60d is stereoscopic image data or planar image data (step S204).

Details of the determination are described in the following. First, the image data 60a to 60d of FIG. 6 read in the signal generator 103 of FIG. 8 include the first direction background image data 61a to the fourth direction background image data 61d corresponding to a background 11 (see FIG. 1) being a planar component of a stereoscopic image 10 of FIG. 1 being an object to be displayed and the first direction spherical body image data 62a to the fourth direction spherical body image data 62d corresponding to a spherical body 12 (see FIG. 1) being a stereoscopic component, respectively.

Hereupon, the spherical body 12 (see FIG. 1) being a stereoscopic component has a large parallax between the first to the fourth directions of FIG. 1 (the directions of arrows 13 to 16 in FIG. 1), and therefore there is a large image difference (namely, a large parallax) between the first to the fourth direction spherical body images 22a to 22d of FIGS. 2 to 5. From this, in the image data 60a to 60d of FIG. 6, there is a low similarity and a large difference between the first to the fourth direction spherical body image data 62a to 62d of FIG. 6 corresponding to the first to the fourth direction spherical body images 22a to 22d (see FIGS. 2 to 5). In other words, the first to the fourth direction spherical body image data 62a to 62d corresponding to the spherical body 12 (see FIG. 1) of the stereoscopic image 10 of FIG. 1 are data including many pieces of parallax information, namely, stereoscopic image data.

On the other hand, the background 11 (see FIG. 1) being a planar component has a small parallax between the first to the fourth directions of FIG. 1 (the directions of arrows 13 to 16 in FIG. 1), and therefore there is a small image difference (namely, a small parallax) between the first to the fourth direction background images 21a to 21d of FIGS. 2 to 5. From this, in the image data 60a to 60d of FIG. 6, there is a high similarity and a small difference between the first to the fourth direction background image data 61a to 61d of FIG. 6 corresponding to the first to the fourth direction background images 21a to 21d (see FIGS. 2 to 5). In other words, the first to the fourth direction background image data 61a to 61d corresponding to the background 11 (see FIG. 1) of the stereoscopic image 10 of FIG. 1 are data including few pieces of parallax information, namely, planar image data.

This embodiment compares the first to the fourth direction spherical body image data 62a to 62d and the first to the fourth direction background image data 61a to 61d with each other in pixels and thereby detects the similarity between these data (difference between these data in other words) (step S203). And it determines whether each of the data 62a to 62d and 61a to 61d is stereoscopic image data including many pieces of parallax information or planar image data having few pieces of parallax information (step S204).

Here, in step S203, a data difference detecting circuit for detecting the similarity between data is generated in a timing generating circuit 1032 of the signal generator 103 of FIG. 8 and the similarity between the data (difference between the data) is detected in pixels using this data difference detecting circuit. And in step S204, based on the result of detection in step S203, a control unit 1031 (see FIG. 8) of the signal generator 103 of FIG. 8 determines the data in pixels.

Here, the control unit 1031 (see FIG. 8) compares the detected value of each pixel obtained in step S203 with a predetermined reference value. And in step S204, the control unit determines detected values higher than the reference value as stereoscopic image data and on the other hand, determines detected values equal to or lower than the reference value as planar image data. Thereby, the data 62a to 62d and 61a to 61d are determined for each pixel.

For example, in the first to the fourth direction spherical body image data 62a to 62d corresponding to the spherical body 12 (see FIG. 1) being a stereoscopic component of the stereoscopic image 10 of FIG. 1, the similarity between the detected data is large and therefore the control unit 1031 (see FIG. 8) of the signal generator 103 of FIG. 8 determines the first to the fourth direction spherical body image data 62a to 62d as stereoscopic image data (step S204: Yes).

And according to the result of determination, in the signal generator 103 of FIG. 8, various control signals for stereoscopic display are generated and these control signals are output to the display panel 101 and the light control panel 102 (see FIG. 8 for both), respectively. Stereoscopic display is performed in domains where the display based on the first to the fourth direction spherical body image data 62a to 62d is to be performed in the display panel 101 and the light control panel 102 (see FIG. 8 for both) having the respective control signals input.

Concretely, in the light control panel 102 (see FIG. 8), an optical slit driver 1023 (see FIG. 8) drives an optical slit member 1022 (see FIG. 8) based on a control signal output from the signal generator 103 of FIG. 8 and thereby forms properly an optical slit 1021 (see FIG. 8) being a light transmitting portion in the optical slit member 1022 (see FIG. 8). Thereby, the amount of transmitted light of a light transmitting portion (namely, an optical slit 1021 of FIG. 8) is adjusted to T1 in a domain in the light control panel 102 corresponding to the display based on the first to the fourth direction spherical body image data 62a to 62d (step S205).

In such a way, the spherical body 12 (see FIG. 1) of the stereoscopic image 10 of FIG. 1 is stereoscopically displayed by observing the first to the fourth direction spherical body image 22a to 22d of FIGS. 2 to 5 successively displayed on the display panel 101 (see FIG. 8) through optical slits 1021 (see FIG. 8) formed in the light control panel 102 (see FIG. 8) (step S206 of FIG. 20).

On the other hand, in the first to the fourth direction background image data 61a to 61d corresponding to the background 11 (see FIG. 1) being a planar component of the stereoscopic image 10 of FIG. 1, the similarity between the detected data is small and therefore the control unit 1031 (see FIG. 8) of the signal generator 103 of FIG. 8 determines the first to the fourth direction background image data 61a to 61d as planar image data (step S204: No).

And according to the result of determination, in the signal generator 103 of FIG. 8, various control signals for planar display are generated and these control signals are output to the display panel 101 and the light control panel 102 (see FIG. 8 for both), respectively. Planar display is performed in domains where the display based on the first to the fourth direction background image data 61a to 61d is to be performed in the display panel 101 and the light control panel 102 (see FIG. 8 for both) having the respective control signals input.

Concretely, in the light control panel 102 (see FIG. 8), the optical slit driver 1023 (see FIG. 8) drives the optical slit member 1022 (see FIG. 8) based on a control signal output from the signal generator 103 of FIG. 8 and thereby forms properly an optical slit 1021 (see FIG. 8) being a light transmitting portion in the optical slit member 1022 (see FIG. 8). Thereby, the amount of transmitted light of a light transmitting portion (namely, an optical slit 1021 of FIG. 8) is adjusted to T2 larger than the amount of transmitted light T1 of the domain where the stereoscopic display is performed in a domain in the light control panel 102 (see FIG. 8) corresponding to the display based on the first to the fourth direction background image data 61a to 61d (step S207).

In such a way, the background 11 (see FIG. 1) of the stereoscopic image 10 of FIG. 1 is plane-displayed by observing the first to the fourth direction background image 21a to 21d of FIGS. 2 to 5 successively displayed on the display panel 101 (see FIG. 8) through optical slits 1021 (see FIG. 8) formed in the light control panel 102 (see FIG. 8) (step S208 of FIG. 20).

Hereupon, since in the light control panel 102 (see FIG. 8) the amount of transmitted light T2 of a light transmitting portion of such a domain where a background 11 (see FIG. 1) is displayed by planar display is larger than the amount of transmitted light T1 of a light transmitting portion of a domain where a spherical body 12 (see FIG. 1) is displayed by stereoscopic display, the external observation brightness of the domain where planar display is performed is higher in comparison with the external observation brightness of the domain where stereoscopic display is performed.

In such a way, this embodiment displays the spherical body 12 of FIG. 1 realizing stereoscopic display in a domain where the display based on the first to the fourth direction spherical body image data 62a to 62d (see FIG. 6) and displays the background 11 of FIG. 1 realizing planar display in a domain where the display based on the first to the fourth direction background image data 61a to 61d (see FIG. 6). Thereby, a system in which a stereoscopic display and a planar display coexist in each domain on the display surface of a stereoscopic display device is realized and as a result of such coexistence, the targeted stereoscopic image 10 of FIG. 1 is obtained (step S209).

After the stereoscopic image 10 of FIG. 1 described above is displayed, it is determined whether an end instruction for a displaying operation is input (step S210). When the end instruction is input (step S210: Yes), the displaying operation is ended. On the other hand, if no end instruction is input (step S210: No), the procedure returns to step S202 again and continues the displaying operation.

As described above, in a stereoscopic display device of this embodiment, a stereoscopic display being lower in external observation brightness, the stereoscopic display having T1 as the amount of transmitted light in a light transmitting portion of the light control panel 102 (see FIG. 8), is performed in some domains of the display surface and a planar display being higher in external observation brightness, the planar display having T2 as the amount of transmitted light in a light transmitting portion of the light control panel 102 (see FIG. 8), is performed in the other domains. A system of this embodiment in which a stereoscopic display and a planar display coexist on the same display surface in such a way improves the external observation brightness as a whole by including a planar display being higher in external observation brightness in comparison with the case of performing a stereoscopic display on the whole display surface. Therefore the stereoscopic image 10 of FIG. 1 can be displayed with a good visual recognition.

In this case, in a domain where a planar display is performed, the background 11 (see FIG. 1) being a planar component of the stereoscopic image of FIG. 1 is displayed based on the first to the fourth direction background image data 61*a* to 61*d* (see FIG. 6) determined as planar image data. Accordingly, the spherical body 12 (see FIG. 1) being a stereoscopic component of the stereoscopic image 10 of FIG. 1 is not influenced by the coexistence of planar display and therefore a good stereoscopic effect can be realized in the spherical body 12 (see FIG. 1). Therefore a stereoscopic display device of this embodiment can realize a good display characteristic and a good visual recognition.

Although the description exemplifies the case of detecting the similarity between data and, from the result of detection, determining whether the data are stereoscopic image data or planar image data, in addition to this, as described above in the first embodiment, the determination information of either stereoscopic image data or planar image data may be added in advance to each of the first to the fourth direction background image data 61*a* to 61*d* and the first to the fourth direction spherical body image data 62*a* to 62*d*, and for example such determination information may be included in each header file of these data 61*a* to 61*d* and 62*a* to 62*d*. According to such a composition, since the detection of the similarity between data as described above is not needed, it is not necessary to generate a data difference detecting circuit in a timing generating circuit 1032 (see FIG. 8) of the signal generator 103 of FIG. 8. Therefore the cost of a system can be reduced and the displaying operation at a higher speed is made possible.

Further, it is preferable that the opening information of an optical slit 1021 (see FIG. 8) corresponding to a light transmitting portion of the light control panel 102 of FIG. 8, namely, the information whether the amount of an optical slit 1021 of FIG. 8 is to be adjusted so as to become T1 corresponding to stereoscopic display or T2 corresponding to planar display is included in advance in each of the first to the fourth direction background image data 61*a* to 61*d* and the first to the fourth direction spherical body image data 62*a* to 62*d*. Thereby, even if these data 61*a* to 61*d* and 62*a* to 62*d* are read at a high speed, it is possible to perform an opening adjustment of a light transmitting portion of the light control panel 102 (see FIG. 8) at a high speed in conjunction with the reading operation.

Although the case of using the image data 60 of FIG. 6 is described above, the image data 60 of FIG. 7 may be used. In case of using the image data 60 of FIG. 7, data corresponding to the background 11 (see FIG. 1) of the stereoscopic image 10 of FIG. 1 are only the first direction background image data 61*a*. In this case, therefore, in a domain where a planar display is performed the first direction background image 21*a* of FIG. 2 is displayed without performing an image update differently from a domain where a stereoscopic display is performed.

By the way, in the composition of this embodiment performing a high-brightness planar display and a low-brightness stereoscopic display in each domain in the same display surface, when the difference in external observation brightness between domains is too large, the external observation brightness in the display surface may become remarkably uneven, and thereby may give an uncomfortable feeling to a user or deteriorate a display characteristic and a visual recognition. Thereupon, to avoid such a problem, it is preferable to adjust the emission brightness of each domain in the display panel 101 (see FIG. 8) according to need so that the difference in external observation brightness between a domain where a planar display is performed and a domain where a stereoscopic display is performed does not become too large. For example, the emission brightness of the display panel 101 (see FIG. 8) is properly adjusted so that the emission brightness in a domain where a planar display is performed becomes lower than the emission brightness in a domain where a stereoscopic display is performed or the emission brightness in a domain where a stereoscopic display is performed becomes higher than the emission brightness in a domain where a planar display is performed.

EXAMPLE 5

Figure 21:
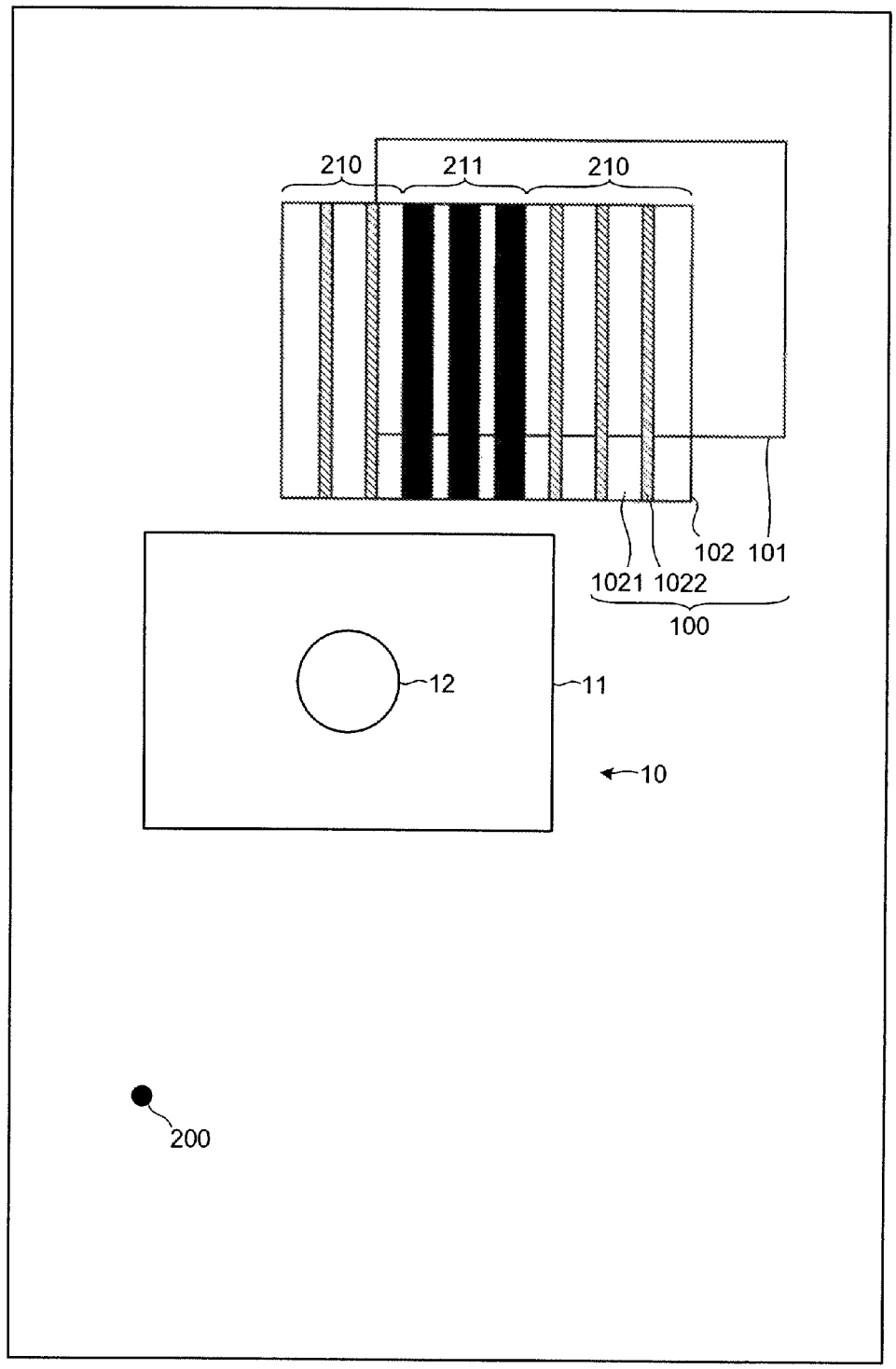
FIG. 21 is a schematic diagram showing a principle of a displaying operation of a stereoscopic display device according to a fifth embodiment of the present invention.

Next, a concrete aspect of this embodiment is described with reference to the following example. FIG. 21 is a schematic diagram for explaining a principle of a displaying operation of a stereoscopic display device of example 5 of the present invention. As shown in FIG. 21, a stereoscopic display device 100 of this example has a structure in which an optical slit member 1022 of a light control panel 102 includes shutter plates 400 (see FIG. 2) similarly to example 1 described above.

In the stereoscopic display device 100 of this example, shutter plates 400 come into an opened state shown in FIG. 14 in domains 210 where a display based on the first to the fourth direction background image data 61*a* to 61*d* of FIG. 6 being planar image data is performed, and therefore optical slits 1021 are formed all over the domains. In this case the amount of transmitted light of the light control panel 102 in domains 210 is T2 and is larger than the amount of transmitted light T1 in domain 211 where a stereoscopic display is performed as described later (step S207 of FIG. 20). A background 11 being a planar component of a targeted stereoscopic image 10 is plane-displayed in domains 210 having such a large amount of transmitted light (step S208 of FIG. 20).

On the other hand, shutter plates 400 are selectively made to come into an opened state in order as shown in FIGS. 12 and 13 in domain 211 where a display based on the first to the fourth direction spherical body image data 62*a* to 62*d* of FIG. 6 being stereoscopic image data is performed, and optical slits 1021 are selectively formed in order. In this case the amount of transmitted light of the light control panel 102 in domains 211 is T1 and is less than the amount of transmitted light T2 in domain 210 where a planar display is performed (step S205 of FIG. 20). In such a way, a stereoscopic display is realized by an MPS-IP method in domain 211 having a small amount of transmitted light, and thereby a spherical body 12 being a stereoscopic component of a targeted stereoscopic image 10 is obtained (step S206 of FIG. 20).

As described above, in the stereoscopic display device 100 of this example, a planar display is performed in domains 210 and a stereoscopic display is performed in domain 211, and as a result a stereoscopic image 10 composed of a background 11 and a spherical body 12 is obtained (step S209 of FIG. 20). Such a stereoscopic display device 100 provides an effect similar to the effect described above in example 1 in which a stereoscopic display and a planar display are changed over from each other with the lapse of time.

EXAMPLE 6

A stereoscopic display device of example 6 of the present invention includes an optical slit member 1022 provided with pinholes shown in FIG. 15, similarly to the stereoscopic display device of example 2. Here, each pinhole 501 of the optical slit member 1022 corresponds to a pixel of the display panel 102 (see FIG. 8), and the pinholes 501 can be controlled to open and close in pixels.

In the stereoscopic display device of this example, a pinhole corresponding to a pixel to be displayed based on the first to the fourth direction background image data 61a to 61d of FIG. 6 being planar image data (see FIG. 15) and a pinhole corresponding to a pixel to be displayed based on the first to the fourth direction spherical body image data 62a to 62d of FIG. 6 being stereoscopic image data (see FIG. 15) are opened and closed differently from each other.

As a result of such opening and closing operations of pinholes 501 (see FIG. 15), pinholes 501 (see FIG. 15) come into an opened state shown in FIG. 17(i) in the domain where a display based on the first to the fourth direction background image data 61a to 61d of FIG. 6 being planar image data. In this case the amount of transmitted light of the light control panel 102 (see FIG. 8) in the domain is T2 and is larger than the amount of transmitted light T1 of a domain where a stereoscopic display is performed as described later (step S207 of FIG. 20). In such a way, a background 11 (see FIG. 1) being a planar component of a targeted stereoscopic image 10 is plane-displayed in a domain having a large amount of transmitted light (step S208 of FIG. 20).

On the other hand, pinholes 501 (see FIG. 15) are selectively made to come into an opened state in order as shown in FIGS. 17(a) to (h) in a domain where a display based on the first to the fourth direction spherical body image data 62a to 62d of FIG. 6 being stereoscopic image data is performed. And the amount of transmitted light of the light control panel 102 is T1 in such a domain where an opened state of pinholes 501 (see FIG. 15) is realized and is less than the amount of transmitted light T2 in a domain where a planar display is performed (step S205 of FIG. 20). In such a way, a stereoscopic display is realized by an MPS-IP method in a domain having a small amount of transmitted light, and thereby a spherical body 12 being a stereoscopic component of a targeted stereoscopic image 10 is obtained (step S206 of FIG. 20).

Although the case of performing a stereoscopic display by an MPS-IP method is described, a stereoscopic display may be performed by a conventional IP method described above in example 3. In this case, pinholes 501 (see FIG. 15) come into an opened state shown in FIGS. 18(a) to (d) in a domain where a display based on the first to the fourth direction spherical body image data 62a to 62d of FIG. 6 is performed, and the amount of transmitted light of the light control panel 102 in the domain becomes T1.

As described above, similarly to example 5, the stereoscopic display device of this example can change over a planar display and a stereoscopic display from each other for each domain and realize a configuration in which both displays coexist. Therefore, this example also provides an effect similar to the effect described above in example 5.

EXAMPLE 7

A stereoscopic display device of example 7 of the present invention includes an optical slit member 1022 provided with a liquid crystal panel 700 shown in FIG. 19 similarly to the stereoscopic display device of example 4. Here, each unit cell 701 of the liquid crystal panel 700 corresponds to a pixel of the display panel 102 (see FIG. 8) and it is possible to control the amount of transmitted light through controlling the polarization of a unit cell 701 in pixels.

In the stereoscopic display device of this example, similarly to example 6, a unit cell 701 (see FIG. 19) corresponding to a pixel to be displayed based on the first to the fourth direction background image data 61a to 61d of FIG. 6 being planar image data and a unit cell 701 (see FIG. 15) corresponding to a pixel to be displayed based on the first to the fourth direction spherical body image data 62a to 62d of FIG. 6 being stereoscopic image data (see FIG. 15) are polarization-controlled differently from each other, and thereby the respective unit cells 701 (see FIG. 15) are adjusted to different amounts of transmitted light.

As a result of such a polarization control operation of unit cells 701 (see FIG. 19), a unit cell 701 (see FIG. 19) comes into an opened state shown in FIG. 17(i) in a domain where a display based on the first to the fourth direction background image data 61a to 61d of FIG. 6 being planar image data similarly to example 6, and the amount of transmitted light of the light control panel 102 (see FIG. 8) in the domain becomes T2 (see step 5207 of FIG. 20). Thereby, in such a domain, a planar display of the background 11 of FIG. 1 is performed (see step 5208 of FIG. 20). On the other hand, a unit cell 701 (see FIG. 19) comes into a light transmitting state shown in FIGS. 17(a) to (h) in a domain where a display based on the first to the fourth direction spherical body image data 62a to 62d of FIG. 6 being stereoscopic image data, and the amount of transmitted light of the light control panel 102 (see FIG. 8) in the domain becomes T1 (see step S205 of FIG. 20). Thereby, in such a domain, a stereoscopic display of the spherical body 12 of FIG. 1 is performed (see step 5206 of FIG. 20).

As described above, similarly to example 6, the stereoscopic display device of this example can change over a planar display and a stereoscopic display from each other for each domain and realize a configuration in which both displays coexist. Therefore, this example also provides an effect similar to the effect described above in example 6.

The first embodiment and the second embodiment described above are exemplifications of the present invention and the present invention is not limited to the configurations. For example, although the first embodiment and the second embodiment exemplifies the case in which determination information for determining whether image data are stereoscopic image data or planar image data is included in the image data, separately to the image data the determination information may be stored in a memory unit 1033 (see FIG. 8) of the signal generator 103 of FIG. 8. Moreover, separately to the image data the opening information of a light transmitting portion of an optical control panel 102 (FIG. 8) may be stored in a memory unit 1033 (see FIG. 8) of the signal generator 103 of FIG. 8.

The present invention can be applied also to a stereoscopic display device of a stereoscopic display method other than an IP method, for example, of a parallax stereogram method. Further, in the present invention, the arrangement position of a light control panel 102 is not limited in particular so long as the light control panel 102 is arranged between an observer and a display panel 101. For example, a light control panel 102 and a display panel 101 may be formed into one body, or the light control panel 102 may be disposed at a distance from the display panel 101, or the light control panel 102 may be disposed independently of the display panel 101.

INDUSTRIAL APPLICABILITY

In such a way, the present invention can be used in various applications, and as an example, applications to an information appliance terminal such as a mobile telephone, a personal computer or the like, a game machine and the like can be mentioned.

The invention claimed is:

1. A device that displays flat images producing binocular parallax and performs stereoscopic displaying, the device comprising:
 a display unit that, based on input image data, displays a plurality of flat images that are components of a stereoscopic image, and
 a light control unit that adjusts an amount of light transmitted from the display unit and is disposed between the display unit and a user viewing the display unit, wherein the light control unit has
  an opaque base body,
  a plurality of sections that are formed on the base body, have a planar dimension, transmit an amount of light, and are visible domains of the flat images, and
  an adjusting unit that adjusts the amount of light transmitted by adjusting all the sections equally, and
 the device displays the stereoscopic image by switching, at a frequency of at least 15 Hz, a stereoscopic component at a particular time and a planar component at a different particular time, wherein for the stereoscopic component the amount of light transmitted by the sections is adjusted to a first amount and for the planar component the amount of light transmitted by the sections is adjusted to a second amount larger than the first amount.

2. The device according to claim 1, wherein
 the display unit selectively and sequentially displays the flat images,
 among the sections, the light control unit makes a specified section, optically transmissible sections and a non-specified section, an opaque section, and selectively and sequentially performs a position change of the optically transmissible sections,
 the flat images to be displayed on the display unit are updated synchronously with the position change of the optically transmissible sections, and
 the flat images corresponding to the optically transmissible sections are displayed.

3. The device according to claim 1, wherein for the stereoscopic component a portion of the stereoscopic image is displayed and for the planar component another portion of the stereoscopic image is displayed.

4. The device according to claim 1, further comprising a determining unit that determines whether the stereoscopic component or the planar component is to be displayed based on the parallax between planar images, wherein
 the adjusting unit adjusts the planar dimension of the sections according to a determination result of the determining unit.

5. The device according to claim 4, wherein the determining unit determines whether the stereoscopic component or the planar component is to be displayed by detecting a similarity amongst image data according to respective flat images, and by obtaining the parallax between the flat images from the similarity detected.

6. The device according to claim 4, wherein the image data corresponding to each of the flat images includes determination information indicating whether the stereoscopic component or the planar component is to be displayed, and
 the determining unit determines whether the stereoscopic component or the planar component is to be displayed based on the determination information.

7. The device according to claim 1, wherein emission brightness of the display unit for the planar component is reduced to a level lower than that of the display unit for the stereoscopic component.

* * * * *